United States Patent [19]

Nohmi et al.

[11] Patent Number: 4,822,489
[45] Date of Patent: Apr. 18, 1989

[54] AROMATIC POLYSULFONE TYPE RESIN HOLLOW FIBER MEMBRANE AND A PROCESS FOR PRODUCING THE SAME

[75] Inventors: Takashi Nohmi, Fuji; Yasuo Hashino, Kashiwa, both of Japan

[73] Assignee: Asahi Kasei Kogyo Kabushiki Kaisha, Japan

[21] Appl. No.: 491,340

[22] PCT Filed: Aug. 23, 1982

[86] PCT No.: PCT/JP82/00329
§ 371 Date: Apr. 20, 1983
§ 102(e) Date: Apr. 20, 1983

[87] PCT Pub. No.: WO83/00705
PCT Pub. Date: Mar. 3, 1983

[30] Foreign Application Priority Data

Aug. 22, 1981 [JP] Japan .................................. 56-131904
Sep. 22, 1981 [JP] Japan .................................. 56-150234
Jan. 29, 1982 [JP] Japan .................................. 57-12863

[51] Int. Cl.[4] .............................................. B01D 13/00
[52] U.S. Cl. ........................... 210/500.23; 210/500.41; 264/45.9
[58] Field of Search .................. 428/305; 264/41, 45.9, 264/178 F, 209.1; 210/500.2, 500.23, 500.41

[56] References Cited

U.S. PATENT DOCUMENTS 4,286,015  8/1981  Yoshida et al. ............. 210/500.2 X
4,385,094  5/1983  Tanaka et al. ............... 210/500.2 X

FOREIGN PATENT DOCUMENTS 0031474  3/1980  Japan .................................. 210/500.2

Primary Examiner—Frank Spear
Attorney, Agent, or Firm—Finnegan, Henderson, Farabow, Garrett & Dunner

[57] ABSTRACT

An aromatic polysulfone type resin hollow fiber membrane having a thickness of 100 to 600 μm and a five-layer structure of an outer surface layer, an outer void layer, an intermediate layer, an inner void layer and an inner surface layer and wherein the inner and outer void layers are present in a thickness ratio of the inner void layer to the outer void layer of 1.5 to 0.6, the intermediate layer has a thickness of 5 to 70 μm, and each of the outer and inner surface layers has an extremely small thickness. The hollow fiber membrane of the kind is excellent in heat resistance, acid resistance, alkali resistance, chemicals resistance and has an improved mechanical strength as well as a high water permeability. The hollow fiber membrane with such excellent properties can be obtained by a process which comprises extruding into an air space a spinning solution of an aromatic polysulfone type resin in an organic polar solvent for said resin, said solution containing a glycol and having a resin concentration of from 15 to 35% by weight, from an annular spinning nozzle to obtain an extrudate in the form of a hollow fiber, allowing the thus obtained extrudate to run in the air space while simultaneously injecting an internal coagulating liquid into the annular spinning nozzle at an inside bore thereof, and subsequently introducing said extrudate into a coagulating liquid bath.

5 Claims, 16 Drawing Sheets

FIG. 7
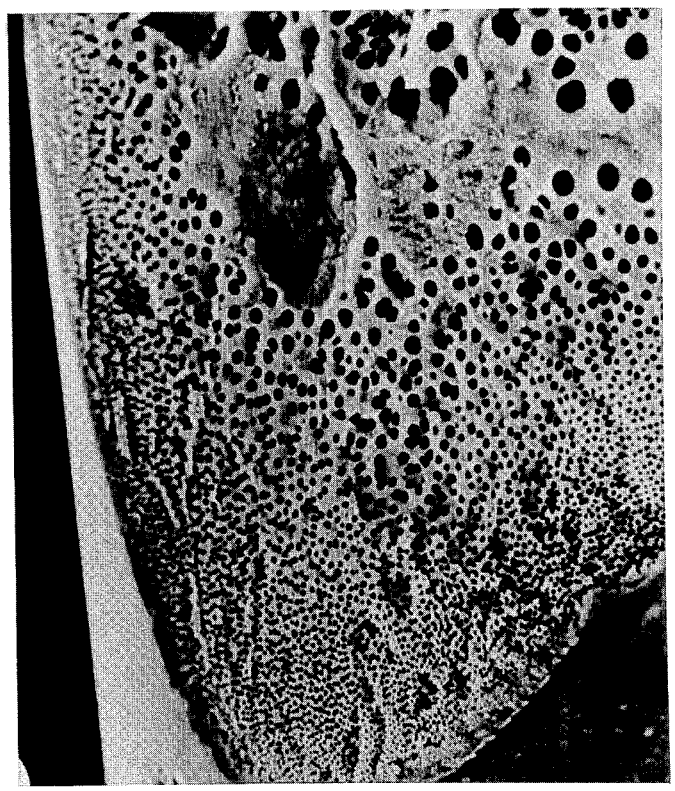
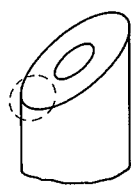

DISTANCE (ℓ) FROM INNER SURFACE OF HORROW FIBER MEMBRANE, μm

FIG. 16
(A) 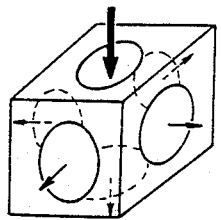
(B) 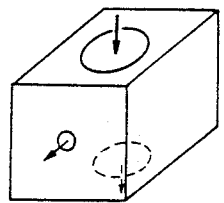

AROMATIC POLYSULFONE TYPE RESIN HOLLOW FIBER MEMBRANE AND A PROCESS FOR PRODUCING THE SAME

FIELD OF THE INVENTION

This invention relates to an aromatic polysulfone type resin hollow fiber membrane with a novel structure, which is useful as an ultrafiltration membrane and is excellent in water permeability, mechanical strength and burst strength, and also relates to a process for producing the same. More particularly, the present invention is concerned with an aromatic polysulfone type resin hollow fiber membrane with a five-layer structure of an outer surface layer, an outer void layer, an intermediate layer, an inner void layer and an inner surface layer, which is excellent in heat resistance, acid resistance, alkali resistance, chemicals resistance and has an improved mechanical strength as well as a high water permeability, and also is concerned with a process for producing the same.

DESCRIPTION OF THE PRIOR ART

There have hitherto been published many papers concerning aromatic polysulfone membranes and aromatic polyether sulfone membranes, but a limited number of them disclose the structure of such membranes. A membrane comprising a surface layer and a void layer as the support layer is disclosed in the specification of U.S. Pat. No. 3,691,068 assigned to Amicon Corporation as well as in Journal of Applied Polymer Science, 20, 2377-2394 (1976), and ibid 21, 165-180 and 1883-1900 (1977) in which the reporter is Gulf South Research Institute. A hollow fiber membrane disclosed in the U.S. Pat. No. 3,691,068 specification has a dense surface layer on the inner surface thereof but has no such a layer on the outer surface thereof. The hollow fiber membrane of this prior art has a plurality of voids which opens at the outer surface of the memrane, said voids are being defined by portions where the polymer is deficient, and each having a size as large as 10 μm or more. The hollow fiber membrane with such a structure has such drawbacks that:

1 they are poor in mechanical strength;
2 they are impossible to back-wash; and
3 they are liable to be plugged or fouled.

Membranes disclosed in the latter were developed for use as supports for reverse osmosis membrane, and each of the membranes has, in both surface portions thereof, a number of pores of 250 Å to 0.44 μm in average diameter. The water permeability of such membranes is at most 1.3 m³/m².day.atm and, hence, of little practical use in ultrafiltration.

Each of the aromatic polysulfone hollow fiber membrane and the aromatic polyether sulfone hollow fiber membrane disclosed in the specification of U.S. Pat. No. 4,286,015 has such a structure that the membrane comprises inner and outer surface layers, inner and outer void layers and an intermediate layer. However, such membranes are mechanically weak, and in addition, each has a poor water permeability because the intermediate layer of the membrane has a structure insufficient in communication. Further, in these hollow fiber membranes, the thickness ratio of the inner void layer to the outer void layer is larger than 1.5, that is, the inner void layer has a thickness larger than that of the outer void layer. This means that the amount of the polymer is relatively large in the outer portion of the membrane and relatively small in the inner portion of the membrane. Therefore, such a hollow fiber membrane has a high permeation resistance in the proximity of the outer surface thereof, and further, is poor in mechanical strength against the pressure from the inside of the membrane.

As described hereinbefore, each of the conventional aromatic polysulfone membrane and the aromatic polyether sulfone membrane is of little practical use because of its poor mechanical strength and low water permeability and, hence, there has been a strong demand for development of a hollow fiber membrane having an improved mechanical strength as well as a high water permeability.

DISCLOSURE OF THE PRESENT INVENTION

A hollow fiber membrane according to the present invention has a structure which is basically similar to that of a hollow fiber membrane disclosed in the specification of U.S. Pat. No. 4,286,015. However, the difference of the hollow fiber membrane of the present invention from the hollow fiber membrane of U.S. Pat. No. 4,286,015 resdes in its specific structure in which: the thicknesses of the inner void layer and outer void layer are not so greatly different from each other; the polymer amount is almost uniformly distributed, thereby causing the permeation resistance of the membrane to be small; and there is formed an intermediate layer which is sufficient in thickness and has a well-developed porous structure where pores of a suitable average diameter are three-dimentionally communicated with one another. The hollow fiber membrane of the present invention characterized by such a specific structure as mentioned just above has a high water permeability as well as an improved burst strength.

According to the present invention, there is provided an aromatic polysulfone type resin hollow fiber membrane having a thickness of 100 to 600 μm and a five-layer structure of an outer surface layer, an outer void layer, an intermediate layer, an inner void layer and an inner surface layer and wherein said inner and outer void layers are present in a thickness ratio of the inner void layer to the outer void layer of 1.5 to 0.6, and said intermediate layer has a thickness of 5 to 70 μm and an average pore diameter of 0.1 to 9 μm, said hollow fiber membrane having a cut-off molecular weight of 13,000 or less.

The present invention will now be described in detail.

As the aromatic polysulfone type resin to be used for forming an aromatic polysulfone type resin hollow fiber membrane, there can be mentioned an aromatic polysulfone and an aromatic polyether sulfone respectively comprised of recurring units of the general formulae (I) and (II)

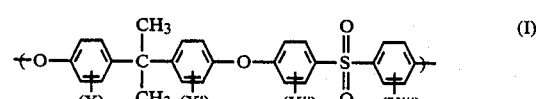

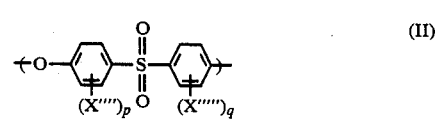

(wherein X, X', X", X''', X'''' and X''''' each independently stand for a non-dissociative substituent such as a lower alkyl group selected from the group consisting of methyl, ethyl, n-propyl and n-butyl or a halogen atom selected from the group consisting of F, Cl, I and Br, or a dissociative substituent such as —COOH, —SO$_3$H, —NH$_2$ or the like, and l, m, n, o, p, q each independently stand for an integer of from 0 to 4). These aromatic polysulfone type resins each preferably have a number average molecular weight of 5,000 to 100,000 as determined according to the osmotic pressure method. These aromatic polysulfone type resins are capable of providing hollow fiber membranes which are excellent in heat resistance, acid resistance, alkali resistance, chemicals resistance and mechanical strength.

The hollow fiber membrane of the present invention has a five-layer structure, that is, an A$_o$B$_o$CB$_i$A$_i$-composed fivelayer structure of an outer surface layer (A$_o$ layer), an outer void layer (B$_o$ layer), an intermediate layer (C layer), an inner void layer (B$_i$ layer) and an inner surface layer (A$_i$ layer). The larger the thickness of the hollow fiber membrane, the higher the burst strength thereof, but needless to say, the lower the water permeability. The thickness of the hollow fiber of the present invention is in the range of approximately from 100 to 600 µm, preferably from 100 to 500 µm. The outer and inner diameters of the hollow fiber of the present invention are not critical, but generally, it is preferred that the outer diameter be about twice the inner diameter. In this respect, the preferred range of the outer diameter of the hollow fiber according to the present invention is from approximately 300 to 5,000 µm.

The surface layers of the hollow fiber of the present invention, i.e., the A$_o$ layer and the A$_i$ layer are almost the same with respect to the structure thereof. The thickness of the A$_o$ layer is almost the same as that of the A$_i$ layer, and is in the range of from 0.01 to 10 µm, usually from 1 to 4 µm. The outer and inner surface layers are each comprised of polymer particles linked together in the form of a string of beads, and each particle has a diameter as small as 0.01 µm or so. The gaps between adjacent polymer particles are small in the proximity of the outer and inner surfaces. This means the polymer particles are present very densely in that portion. However, the gaps between adjacent particles as well as the size of each particle increase progressively from the outer and inner surfaces toward the interior of the hollow fiber. Even by the observation by a scanning electron microscope, the surface of each of the outer and inner surface layers is so smooth that pores present therein cannot be observed. However, the measurement of the permeation resistance effected by passing aqueous solutions of dextran molecules with various molecular weights or aqueous solutions of various proteins through the hollow fiber shows that in the surface portion of each of the outer and inner surface layers, there are formed pores having a cut-off molecular weight of 13,000 or less as measured by the use of an aqueous solution of a globular protein. The pore diameter is supposed to be in the range of approximately from 10 to 100 Å, which corresponds to the range suitable for ultrafiltration. This means that the diameter of pores formed in the outer and inner surface layers is such that the proportion cut-off of dextran molecules having an average molecular weight of 70,000 is 70% or more.

The A$_o$ layer and the A$_i$ layer serve to selectively permeate molecules therethrough according to the size of the molecules. The smaller the thickness of these surface layers, the higher the water permeability of the hollow fiber. Since the hollow fiber of the present invention has two surface layers, i.e., the outer surface layer and the inner surface layer, a leakage of molecules which must be cut-off can be prevented even when one of these two layers accidentally becomes defective. Accordingly, by the use of a hollow fiber of the present invention which possesses two surface layers, contrary to the case where a conventional hollow fiber having only one surface layer is employed, a safer operation is ensured, and further, a cut-off molecular weight becomes sharp.

A large number of voids are present at the portion contiguous to the A$_i$ layer. The voids are portions where a polymer is deficient, and each void has a shape of a cone. In a cross section of the hollow fiber, the voids each show a longitudinal section of a slender cone straightly extending in a radial direction of the cross section of the hollow fiber, and hence, the voids each have an almost circular shape in a longitudinal section of the hollow fiber. All of the voids present at the portion contiguous to the A$_i$ layer have their respective apexes pointing toward the A$_i$ layer. The voids each have a diameter gradually increased to the end portion opposite to the apex, which end portion is present on the side of the interior of the hollow fiber, and the opposite end of each void to the apex is enclosed with an arcked wall. The observation of the entire cross section of the hollow fiber shows that the voids, as a whole, form an annulus having an almost uniform thickness and the annulus surrounds the A$_i$ layer. The annulus formed of such voids is herein referred to as a void layer (B$_i$ layer). A large number of voids each having a similar shape to that of the void as mentioned just above are present separately and located at a portion contiguous to the A$_o$ layer, thereby forming another void layer (B$_o$ layer). In this void layer, all of the voids have their respective apexes pointing toward the A$_o$ layer. The thickness of each void layer is obtained by using a scanning electron microphotograph showing the entire cross section of the hollow fiber, which cross section is taken along the plane perpendicular to the fiber axis. In such a photograph, the thickness of the void layer is defined as a distance between a point at which a straight line drawn from the center of the cross section of the hollow fiber in a radial direction thereof intersects the inner periphery of the annulus and another point at which the same straight line as mentioned just above intersects the outer periphery of said annulus. The inner and outer peripheries as mentioned above are determined as follows. First, determination of the outer periphery of the B$_i$ layer is explained. Use is made of a scanning electron microphotograph ($\times$50 to 300 magnification) of the entire cross section of a hollow fiber of the present invention. From the center of a cross section of the central bore of the hollow fiber, six lines are drawn, at angular intervals of 60°, in radial directions, thereby to form six fractions. Among the voids present in each of said six fractions, selected is a void extending most deeply into the interior of the hollow fiber. Then, a distance between the center of the cross section of the central bore of the hollow fiber and the opposite end of said void to the apex is measured. As a result, six values in total with respect to the above-defined distance are obtained. Next, another set of six fractions is formed by shifting the phase of each fraction formed above by 20° in a clockwise direction. The same distance measurement as mentioned above is repeated, thereby to obtain another set of six values. Further, the phase of each of the six fractions obtained in the second attempt is shifted again by 20° in a clockwise direction, and six values are obtained in the same manner as mentioned hereinabove. In grand total, eighteen values are obtained. The arithmetical average of the thus obtained eighteen values is obtained. Then, a circle having a radius of a length corresponding to the above-obtained average value is drawn around the center of the cross section of the central bore of the hollow fiber shown in the electron microphotograph. The outer periphery of the $B_i$ layer is defined as the circle thus obtained. The inner periphery of the $B_o$ layer is determined by the similar process as mentioned above. The inner periphery of the $B_i$ layer is expressed as the boundary line between the $B_i$ layer and the $A_i$ layer, and the outer periphery of the $B_o$ layer is expressed as the boundary line between the $B_o$ layer and the $A_o$ layer. These boundary lines are clear and, hence, can be easily discriminated. According to the present invention, the inner and outer void layers respectively have a thickness of 10 to 370 $\mu$m. The thicknesses of the void layers occupy a main part of the entire thickness of the hollow fiber. If the void layers are too thick, the hollow fiber becomes poor in burst strength. The hollow fiber of the present invention is excellent in burst strength due to the presence of an intermediate layer. Each of the voids present in the inner and outer void layers has a length larger in a radial direction of the hollow fiber than in a direction perpendicular to said radial direction and, hence, the void layer can allow the liquid to pass therethrough promptly without any resistance. Due to such a function of the void layers, the liquid flowing into one surface layer of the present hollow fiber membrane is able to reach the intermediate layer smoothly, and the liquid flowing out of the intermediate layer is able to reach the other surface layer smoothly, thereby causing the water permeability of the hollow fiber membrane to be high. Accordingly, it can be said that the $B_o$ layer and the $B_i$ layer much contribute to the improvement not only in mechanical strength but also in water permeability of the hollow fiber membrane.

A large number of Cp pores (which will be mentioned later) are present in the inner wall of the void.

It is preferred that the thickness ratio of the $B_i$ layer to the $B_o$ layer be close to 1. Accordingly, it is preferred that the intermediate layer be located at a portion approximately equidistant from the outer and inner surfaces of the hollow fiber. When the thickness of the $B_i$ layer is largely different from that of the $B_o$ layer, the hollow fiber membrane becomes poor in burst strength as well as in mechanical strength and, in addition, the void layer having a relatively large thickness is unfavorably apt to undergo compaction phenomenon. It is preferred that the thickness ratio of the inner void layer to the outer void layer ($l_{Bi}/l_{Bo}$ ratio) (hereinafter abbreviated as the inner void layer-to-outer void layer ratio) be 1.5 to 0.6. When this ratio exceeds 1.5, not only the mechanical strength of the hollow fiber membrane is markedly reduced but also the water permeability thereof is lowered. On the other hand, if such a ratio is less than 0.6, the water permeability of the hollow fiber membrane is so poor that the hollow fiber membrane cannot withstand a practical use.

The hollow fiber according to the present invention possesses an intermediate layer (C layer). The intermediate layer (C layer) means a layer defined by the voids present in the $B_i$ layer and the voids present in the $B_o$ layer. The thickness of the C layer is defined as the thickness of the thinnest portion of that layer, and it is usually in the range of from 5 to 70 $\mu$m. The thickness of the C layer is measured by the use of a scanning electron microphotograph ($\times$ 50 to 3,000 magnification) showing an entire cross section of the hollow fiber, which cross section is taken along the plane perpendicular to the axial direction of the hollow fiber. The C layer is a polymer layer with a network structure in which the Cp pores are developed and three-dimentionally well-communicated one another. In the C layer, the polymer particles are linked together firmly and three-dimentionally, thus causing a remarkable improvement in mechanical properties of the hollow fiber, such as burst strength, compression strength and tensile strength. The average diameter of the Cp pores is ranging from 0.1 to 9 $\mu$m. The thickness of the C layer is in the range of 5 to 70 $\mu$m, which is much larger than that of the $A_o$ layer and the $A_i$ layer. Apart from the voids, the Cp pores present in the hollow fiber membrane of the present invention are the pores which are communicated one another, and the size thereof increases gradually from the inner and outer surfaces of the membrane toward the interior thereof, and becomes maximum in the C layer which is located at a portion equidistant from the both surfaces of the membrane. Accordingly, it can be said that the high water permeability of the hollow fiber membrane can be ensured by the presence of the C layer also. However, the permeation resistance of the C layer is relatively high as compared with those of the B layers, so it cannot be avoided that the water permeability of the hollow fiber membrane decreases proportionally with the increase in thickness of the C layer. When the thickness of the C layer exceeds 70 $\mu$m, the hollow fiber membrane has a water permeability as small as less than 3 $m^3/m^2 \cdot day \cdot atm$. On the other hand, the thickness of the C layer has a great influence on the burst strength of the hollow fiber membrane. Specifically, when the thickness of the C layer is less than 5 $\mu$m, the hollow fiber membrane has a burst strength of less than 15 kg/cm$^2$. The hollow fiber membrane having a burst strength as small as less than 15 kg/cm$^2$ cannot withstand a continuous operation effected for a long period of time.

As is apparent from the definition of the thickness given with respect to each of the $A_i$, $B_i$, C, $B_o$ and $A_o$ layers as mentioned above, the total of the thickness of each layer is not always identical with the whole membrane thickness of the hollow fiber.

A single unit of the Cp pore structure of the intermediate layer of a hollow fiber membrane of the present invention is diagramatically illustrated in FIG. 16 and designated as (A), shown in comparison with that of a conventional hollow fiber membrane (B). As is shown in FIG. 16-(A), in the intermediate layer of the hollow fiber of the present invention, the three-dimentional communication of the Cp pores is greatly improved, as compared with the case of the conventional hollow fiber shown in FIG. 16-(B). Accordingly, in the case of the intermediate layer of the hollow fiber membrane of the present invention, the permeation liquid flowing thereinto in the direction indicated by an arrow shown in FIG. 16-(A) can flow out from every opening (five Cp pores) formed in the cubic structure. On the contrary, the liquid flowing into the intermediate layer of the conventional hollow fiber as shown in FIG. 16-(B) can flow out merely from the limited Cp pores because the Cp pores formed therein are not well-communicated one another. Due to the presence of the Cp pores which are three-dimensionally well-communicated one another, the intermediate layer of the hollow fiber membrane of the present invention has an extremely low permeation resistance.

diameter of pores present in each layer and the thickness and the outer diameter of the membrane. The results obtained are shown in Table 1.

TABLE 1

|  | $A_o$ | $B_o$ | C | $B_i$ | $A_i$ | Membrane thickness | Outer diameter |
|---|---|---|---|---|---|---|---|
| Thickness, μm | 2–3 | 120 | 40 | 120 | 2–3 | 300 | 1400 |
| Average Pore Diameter, μm | <0.01 | 0.01–3 | 0.1–5 | 0.01–3 | <0.01 |  |  |

Properties and functions of each of the five layers of the hollow fiber are roughly explained hereinabove. Referring now to the scanning electron microphotographs showing cross sections of the hollow fiber membranes obtained in Examples, the hollow fiber of the present invention will be illustrated in detail.

FIG. 1 is a schematic diagram of a cross section of a hollow fiber membrane of the present invention in which the $A_o$, $B_o$, C, $B_i$ and $A_i$ layers are illustrated.

FIG. 2 is a scanning electron microphotograph (×82 magnification) of a freeze-broken entire cross section of a hollow fiber membrane of the present invention obtained in Example 1 which will be given later, said cross section being taken along the plane perpendicular to the fiber axis of said membrane.

FIG. 3 is a scanning electron microphotograph (×330 magnification) showing an enlarged view of a portion of the cross section shown in FIG. 2.

FIG. 4 is a scanning electron microphotograph (×1,400 magnification) showing an enlarged view of a portion of the cross section shown in FIG. 2, which portion includes part of each of the $A_i$ layer and the $B_i$ layer.

FIG. 5 is a scanning electron microphotograph (×14,000 magnification) of a portion of the cross section shown in FIG. 2, which portion includes part of the inner surface layer, i.e., the $A_i$ layer.

FIG. 6 is a scanning electron microphotograph (×14,000 magnification) of a portion of the cross section shown in FIG. 2, which portion includes part of the outer surface layer, i.e., the $A_o$ layer.

FIG. 7 is a scanning electron microphotograph (×190 magnification) of a portion of the freeze-broken, oblique cross section of a hollow fiber of the present invention obtained in Example 1 whch will be given later, said portion corresponding to the encircled portion of a diagram given below the photograph. The microphotograph shows the arrangement of voids in the outer void layer, from which it is clearly observed that the diameter of the Cp pores increases gradually from the outer surface of the membrane toward the interior thereof, and from which the density of Cp pores present in the outer void layer is clearly observed.

FIG. 8 is a scanning electron microphotograph (×1,400 magnification) of a portion of the cross section shown in FIG. 2, which portion includes part of the intermediate layer (C layer).

FIG. 9 is a scanning electron microphotograph (×14,000 magnification) showing an enlarged view of the intermediate layer (C layer) shown in FIG. 8. From this microphotograph, it can be observed that the Cp pores present in the C layer are three-dimentionally well-communicated one another, and also can be understood that the C layer has a three-dimentionally-developed network structure.

A hollow fiber of the present invention which is similar to that shown in FIGS. 2 to 9 was examined with respect to the thickness of each layer and the average (the average pore diameter of each of the $B_o$ and $B_i$ layers was obtained by measuring the diameters of Cp pores which present between the voids in each void layer by means of a scanning electron microphotograph.)

FIG. 10 is composed of curves showing the relationship between the radius of the Cp pore and the distance from the inner surface of a hollow fiber. The data from which the curves were formed were obtained on two hollow fibers each prepared in Example 1 as will be given later. It can be observed from FIG. 10 that the radius of the Cp pore increases gradually from the inner surface of the hollow fiber toward the interior thereof. A process for producing a hollow fiber of the present invention will be mentioned later, but in FIG. 10, a curve —○— was obtained from the data on a hollow fiber membrane obtained by using a spinning solution of 17.0 wt % in polymer concentration, and a curve —x— was obtained from the data on a hollow fiber membrane obtained by using a spinning solution of 20.0 wt % in polymer concentration. From FIG. 10, it can be clearly understood that the diameter of the Cp pore present in the hollow fiber membrane obtained from the spinning solution with a higher polymer concentration, i.e., 20 wt % is smaller than that of the Cp pore present in the hollow fiber membrane obtained from the spinning solution with a lower polymer concentration. Further, it can also be understood that in the former hollow fiber membrane, there are formed smaller Cp pores with a higher density than in the latter. Therefore, the mechanical strength of the membrane becomes high with the increase in polymer concentration of a spinning solution.

FIG. 11 is composed of graphs showing the relationship between the water permeability and the membrane thickness. The graphs were obtained from the data on aromatic polysulfone hollow fibers with various thicknesses obtained by the process of the present invention and on aromatic polysulfone hollow fibers with various thicknesses obtained in the Comparative Example. In FIG. 11, the curve —○— was obtained from the data on a hollow fiber obtained from a spinning solution having a polymer concetration of 20.0 wt %, and the curve —△— was obtained from the data on a hollow fiber obtained from a spinning solution having a polymer concentration of 15.0 wt %. The above-mentioned two hollow fibers are obtained according to the process of the present invention. On the other hand, the curve —●— was obtained from the data on a comparative hollow fiber obtained by using a spinning solution having a polymer concentration of 15.0 wt % and containing therein no glycol.

FIG. 12 is a graph showing the relationship between the water permeability and the membrane thickness. The graph was obtained from the data on aromatic polyether sulfone hollow fibers of the present invention.

From FIGS. 11 to 12, it can be readily understood that, in the case of the hollow fiber of the present invention, the water permeability varies in direct proportion to the membrane thickness.

FIG. 13 is composed of curves showing the relationships between the water permeability and the burst strength and the thickness of the intermediate layer. The curves were obtained from the data on hollow fibers of the present invention differing in thickness of the intermediate layer. In FIG. 13, the curves —x— and —○— designate the water premeability and the burst strength, respectively. As is clear from FIG. 13, the larger the thickness of the intermediate layer, the higher the burst strength. Also, it can be observed from FIG. 13 that the larger the thickness of the intermediate layer, the lower the water permeability. Especially, the water permeability begins to decrease drastically from a certain thickness of the intermediate layer.

With respect to the Cp pores, as described in "Kobunshi Ronbun Shu", vol. 34, No. 3, pp. 205-216 (1977), published by the Polymer Society of Japan, where in a water-in-oil type sphere as small as 100 Å (small particle of emulsion) the oil is occupied by a polymer-rich phase and the water is occupied by a polymer-lean phase, there are formed structures called Cp pores. The Cp pore is characterized by having a circular shape in front and in cross section. On the other hand, a pore having a long and narrow shape is called a Up pore.

The inner void layer-to-outer void layer ratio as herein referred to means a ratio of the thickness of the inner void layer ($l_{Bi}$) of the aromatic polysulfone type resin hollow fiber membrane of the present invention to the thickness of the outer void layer ($l_{Bo}$) thereof, that is, it means a $l_{Bi}/l_{Bo}$ ratio. $l_{Bi}$ and $l_{Bo}$ can be obtained by the method as mentioned before. With respect to the aromatic polysulfone type resin hollow fiber membrane of the present invention, the inner void layer-to-outer void layer ratio is in the range of 1.5 to 0.6, more preferably, 1.4 to 1.0.

In another aspect of the present invention, there is provided a process for producing an aromatic polysulfone type resin hollow fiber membrane comprising the steps of extruding into an air space a spinning solution of an aromatic polysulfone type resin in an organic polar solvent for said resin, said solution containing a glycol and having a resin concentration of from 15 to 35% by weight, from an annular spinning nozzle which is provided with a polymer-extruding annular orifice having an orifice width of from 110 to 700 μm as measured on the polymer-extruding side of the nozzle to obtain an extrudate in the form of a hollow fiber, allowing the thus obtained extrudate to run 0.1 to 30 cm in the air while simultaneously injecting as internal coagulating liquid a liquid miscible with said organic polar solvent but incapable of dissolving the polysulfone type resin into the annular spinning nozzle at an inside bore thereof, and subsequently introducing said extrudate into a coagulating liquid bath comprising a liquid miscible with said organic polar solvent but incapable of dissolving the polysulfone type resin.

The important features of the process of the present invention are: adding a glycol as an additive into a spinning solution; controlling the polymer concentration of a spinning solution to an appropriate value; allowing the extrudate to run in an air space before it is brought into contact with a coagulating liquid bath; and adjusting the membrane thickness of the hollow fiber to an appropriate value.

Any organic polar solvent can be used in the process of the present invention as far as it is capable of dissolving therein an aromatic polysulfone type resin. As preferred examples of such a solvent, there can be mentioned N-methylpyrrolidone, dimethylformamide, dimethylacetamide and diethylacetamide.

In the process of producing a hollow fiber membrane of the present invention, addition of a glycol into a spinning solution is of crucial importance. If use is made of a spinning solution containing no such a glycol, for example, a polymer solution consisting only of an aromatic polysulfone type resin and an organic polar solvent, a polymer solution containing an aqueous solution of a metal salt of an inorganic acid or a metal salt of an organic acid as described in the U.S. Pat. No. 4,286,015 specification, or a spinning solution containing polyvinylpyrrolidone, there can also be obtained a hollow fiber membrane with a five layer structure, however, there cannot be obtained a hollow fiber membrane excellent not only in burst strength but also in water permeability and has an inner void layer-to-outer void layer ratio of 1.5 to 0.6, and in which an intermediate layer having a structure extremely sufficient in communication is formed. Addition of a glycol contributes to formation of an intermediate layer which has an extremely small permeation resistance. Therefore, according to the process of the present invention, it has become possible to prepare a hollow fiber membrane from a spinning solution with a relatively high polymer concentration as compared with the conventionally used spinning solutions, and at the same time, it has become possible to improve the mechanical strength of the hollow fiber membrane.

A hollow fiber membrane obtained according to the process of the present invention has excellent properties such as a water permeability of 3 $m^3/m^2$.day.atm or more, a burst strength of 15 $kg/cm^2$ or more and a tensile strength of 20 $kg/cm^2$ or more [measured by Shimadzu Autograph IM-100 (trade name of a testing machine for tensile strength manufactured and sold by Shimadzu Corporation, Japan)].

As preferred examples of a glycol to be used in the process of the present invention, there can be mentioned ethylene glycol, diethylene glycol, triethylene glycol, tetraethylene glycol, polyethylene glycol (having a number average molecular weight of 200 to 6,000), propylene glycol, dipropylene glycol, tripropylene glycol, polypropylene glycol (having a number average molecular weight of 200 to 6,000), glycerin, trimethylolpropane, ethylene glycol methyl ether derivatives such as ethylene glycol monomethyl ether, ethylene glycol dimethyl ether, diethylene glycol monomethyl ether, diethylene glycol dimethyl ether, triethylene glycol monomethyl ether and propylene glycol derivatives such as propylene glycol monomethyl ethe or the like. These glycols as mentioned just above may be used alone or in combination. Of them, a glycol having a number average molecular weight similar to that of tetraethylene glycol is especially preferred. The proportion of the glycol to the polymer solution is not critical in so far as the state of the polymer solution in which the polymer is uniformly dissolved can be maintained. Such a proportion may be varied depending upon, for example, the polymer concentration of the solution and the kind of the polar solvent employed, but usually a glycol is incorporated in an amount of 0.5 to 30% by weight based on the total weight of the spinning solution. When the glycol content is less than 0.5% by weight, there can hardly be expected the desired effect of the glycol on the formation of a hollow fiber membrane. When the glycol content exceeds 30% by weight, the polymer solution becomes instable and opaque and, in addition, the membrane-forming performance of the spinning solution is so lowered that there cannot be obtained a hollow fiber membrane with excellent properties. The preferred glycol content is 3 to 20% by weight, more preferably, to 15% by weight.

The concentration of the polymer in the spinning solution is in the range of from 15 to 35% by weight based on the total weight of the spinning solution, preferably from 18 to 25% by weight. When the concentration of the polymer exceeds 35% by weight, the resulting semipermeable membrane is so poor in water permeability that it cannot be put to practical use. In contrast, when the polymer concentration is lower than 15% by weight, the intermediate layer of the resulting hollow fiber membrane has an insufficient thickness and the average pore diameter of the pores present in the intermediate layer exceeds 9 μm, resulting in formation of a hollow fiber membrane which is poor in mechanical strength or in burst strength.

The polymer concentration of the original solution is closely related to a structure of a hollow fiber prepared therefrom. In preparing a flat membrane, when an original solution with a polymer content of as low as less than 15% by weight is used, there is obtained a membrane of a double-layer structure of a surface layer(A) and a void layer(B) in which the void layer grows long in a thicknesswise direction of the membrane. On the other hand, when use is made of a solution with a polymer content of as high as 15% by weight or more, an intermediate layer grows with the increase of the polymer concentration, whereby there is formed a flat membrane of a three-layer structure of a surface layer(A), a void layer(B) and an intermediate layer(C). However, the flat membrane is extremely poor in water permeability whatever structure it may have. For reference, there is shown in FIG. 14 a relationship between the water permeability and the membrane thickness of a flat membrane having an ABC-composed three-layer structure. From FIG. 14, it is clear that when the thickness of the flat membrane is 100 μm or more, the water permeability of the membrane is extremely low.

On the other hand, in preparing a hollow fiber, when a low polymer content spinning solution is used and coagulation of the outside and the inside of an extrudate in the form of a hollow fiber is effected, there is obtained a hollow fiber having surface layers(A) and void layers(B) in which voids are irregularly present. In such a hollow fiber, an intermediate layer is present but the thickness thereof is extremely small, and hence, the hollow fiber has a structure of the $A_i$, $B_i$, $B_o$ and $A_o$ layers arranged in that sequence. The hollow fiber with such a structure, however, is so poor in mechanical strength that it cannot stand a continuous operation in which back-washing of the hollow fiber is effected.

When coagulation of only the outside or the inside of the extrudate is effected, there is obtained a hollow fiber with a double-layer structure of a surface layer(A) and a void layer(B). The surface layer(A) and the void layer (B) are arranged in either order of AB or BA. In this case, the surface layer is formed on the inner surface or the outer surface of the hollow fiber. However, the hollow fiber having such a double-layer structure is so mechanically weak that it cannot stand a continuous operation in which back-washing of the hollow fiber is effected. By using, as the spinning solution, a solution with a polymer content of as high as 15% by weight or more, and by effecting coagulation of both the outside and inside of the extrudate, there can be obtained a hollow fiber with a five-layer structure of two surface layers, two void layers and in addition, an intermediate layer with a suitable thickness, which hollow fiber has not only an improved mechanical strength but also a high water permeability. For reference, there is shown in FIG. 15 a relationship between the burst strength and the membrane thickness of a hollow fiber of the present invention which has a five-layer structure of $A_o$, $B_o$, C, $B_i$ and $A_i$ layers, shown in comparison with that of a hollow fiber with a $A_i$-$B_o$ structure and a $B_i$-$A_o$ structure. From FIG. 15, it is apparent that the hollow fiber with a five-layer structure is remarkably excellent in burst strength, as compared with the hollow fiber with a double-layer structure.

According to the process of the present invention, the spinning solution is extruded into an air space in the form of a hollow fiber from an annular spinning nozzle which is provided with a polymer-extruding annular orifice having an orifice width of 110 to 700 μm as measured on the polymer-extruding side of the nozzle. The thickness of the hollow fiber membrane is varied according to the orifice width of the annular spinning nozzle, and is not greatly affected by other spinning conditions. Usually, the membrane thickness is smaller than the orifice width of the nozzle. When an annular spinning nozzle of which the orifice width is in the range of from 110 to 700 μm is used, there can be obtained a hollow fiber membrane having a thickness of from 100 to 600 μm.

As the coagulating liquid, water is most generally used. However, there may also be employed an organic solvent which is incapable of dissolving the polymer. Examples of such an organic solvent include methanol, ethanol and the like. These non-solvents may be employed alone or in mixture of two or more kinds of such non-solvents. It is preferred that the internal coagulating liquid and the coagulating liquid bath be the same.

In preparing a hollow fiber, a coagulating liquid must be employed as the internal and external coagulating liquids so that coagulation of both of the outside and the inside of the extrudate in the form of a hollow fiber is performed. In order to maintain the inner void layer-to-outer void layer ratio at such a desired value as 1.5 to 0.6, it is required to extrude the spinning solution firstly into an air space before it is contacted with the coagulating liquid. The running-in-air distance which means a distance between the tip of the spinning nozzle and the surface of the coagulating liquid bath may slightly be varied according to other spinning conditions, and hence, the preferred range of such distance cannot be established unconditionally. However, for example, in order to obtain a hollow fiber with increased thickness and diameter, it is required to render the running-in-air distance short. It is preferred that the running-in-air distance be in the range of approximately from 0.1 to 30 cm. In case that the running-in-air distance is less than 0.1 cm, there is obtained a hollow fiber of which the inner void layer-to-outer void layer ratio exceeds 1.5. On the other hand, if the running-in-air distance exceeds 30 cm, it is difficult to obtain a hollow fiber which is free from deformation. In order to prepare a hollow fiber with a five-layer structure characteristic of the present invention it is necessary to render the membrane thickness in the range of from 100 to 600 μm, more preferably, from 100 to 400 μm.

FIG. 10 shows the relationship between the radius of the Cp pore (r) and the distance (l) from the inner surface of a hollow fiber. Specifically, the curves are obtained from the data on two hollow fibers each having a thickness of 300 μm and each obtained by the use of a spinning solution in which Udel polysulfone ® (trademark of a polysulfone type resin manufactured by Union Carbide Corp., U.S.A.) is dissolved in a mixed solvent of dimethylacetamide and tetraethylene glycol. The polymer concentrations of the two spinning solutions were 17.0% by weight and 20% by weight, respectively. FIG. 10 shows that the radius of the Cp pore increases progressively from the surface of the hollow fiber to the interior thereof and that the pore diameter of the hollow fiber obtained by using a spinning solution with a polymer concentration of 20% by weight is relatively much smaller than that of a hollow fiber obtained by using a spinning solution with a polymer concentration of 17.0% by weight.

The aromatic polysulfone type resin hollow fiber membrane of the present invention is capable of passing therethrough a globular protein having a molecular weight of less than 13,000, but incapable of passing therethrough substances having molecular weights larger than the mentioned above, such as albumin, globulin contained in body fluid, pyrogen substances, bacteria (1–2 μm), yeast (2–4 μm) and causative viruses of diseases (molecular weight: 2,400,000). Accordingly, the hollow fiber membrane of the present invention can advantageously be used for removal of pyrogen substances from the parenteral solution or from the infusion solution, preparation of the absolutely-purified water and concentration of proteins. The hollow fiber membrane of the present invention can advantageously be used especially in the applications where the membrane is required, before it is used for separation and purification of substances, to be repeatedly subjected to sterilization under high temperatures, sterilization with acid, alkali or the like, such as separation and purification of medical products or food stuffs or preparation of the absolutely-purified water.

PREFERRED EMBODIMENTS OF THE INVENTION

The present invention will now be illustrated in more detail by the following Examples that should not be construed as limiting the scope of the invention.

In Examples, the water permeability, the cut-off molecular weight and the burst strength of the aromatic polysulfone type resin hollow fiber membrane were determined by the following methods.

(1) Measurement of the water permeability

A predetermined number of hollow fibers whose outer and inner diameters have been measured in advance are bundled into a module and one end of said module is sealed. Water is injected from the other end of said module at which the hollow fibers are unified by means of an adhesive. The effective length of the module is 25 cm and the difference in pressure between the inside and the outside of the hollow fiber is 1 atm. Under such conditions, the permeability ($m^3/m^2$·day·atm) of the hollow fiber to a 25° C. distilled water is measured.

(2) Measurement of the cut-off molecular weight

One end of a hollow fiber of which the outer and inner diameters have been measured in advance is used as an inlet for water and the other end of said hollow fiber is used as an outlet for water. The effective length of the fiber is 25 cm, the pressure at the inlet portion is 1.2 kg/cm² or less, the pressure at the outlet portion is 0.8 kg/cm² or more, the average of the pressure in the inlet and outlet portions is 1.0 kg/cm² and the linear velocity of the water is 1.0 m/sec. Under such conditions, aqueous solutions of various molecules are, at a temperature of 25° C., introduced into said fiber from the inlet portion thereof. After 10 minutes, 0.5 ml of the filtrate is taken, and the proportions cut-off of various molecules are calculated from the amount of molecules contained therein. When the proportion cut-off of dextran molecules is determined, use is made of an aqueous 5.0 wt % solution thereof. On the other hand, when the proportion cut-off of a globular protein is determined, use is made of an aqueous 0.25 wt % solution thereof. In latter case, the hollow fiber should be, prior to injection of the solution, dipped into said solution (5° C.) for 12 hours so that the hollow fiber is not adversely affected by adsorption of the protein.

(3) Measurement of the burst strength

A hollow fiber is bended in the form of a loop, and boths end thereof are fixed. Pneumatic pressure is equally applied to the hollow fiber from each of the ends of the hollow fiber thus fixed, and thereafter, the pressure is gradually raised at an elevation rate of 10 kg/cm²/min. The burst strength is defined as a pressure at which the hollow fiber ruptures.

EXAMPLE 1

Dimethylacetamide as a solvent, tetraethylene glycol as an additive and Udel polysulfone ® (trademark of a polysulfone manufactured and sold by Union Carbide Corp., U.S.A.) comprising recurring units represented by the formula:

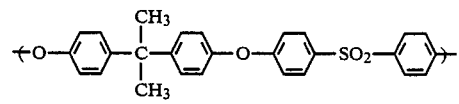

as a polymer were mixed in a weight ratio of 71:9:20 to obtain a homogeneous polymer solution. The thus obtained polymer solution was used as a spinning solution. The spinning solution thus obtained was then extruded from an annular hollow fiber spinning nozzle [provided with a polymer-extruding annular orifice having an orifice width of 330 μm (hereinafter only the value is indicated)]. Purified water was used as internal and external coagulating liquids to effect coagulation of both the inside and outside of the resulting extrudate. As a result, there was obtained a porous membrane in the form of a hollow fiber having an inner diameter of 0.75 mm, an outer diameter of 1.35 mm and a membrane thickness of 0.3 mm. The distance between the tip of the spinning nozzle and the surface of the external coagulating liquid (hereinafter abbreviated as "running-in-air distance") was 1.5 cm.

The thus obtained hollow fiber had the following properties: water permeability, 12 m³/m²·day·atm·water at 25° C.; burst strength, 31 kg/cm².

The proportions cut-off of dextran molecules having an average molecular weight of $1 \times 10^4$, $4 \times 10^4$ and $7 \times 10^4$ were 24.0%, 80.0% and 83.0%, respectively.

The proportion cut-off of type C cytochrome which is a globular protein having a molecular weight of 13,000 was 95% or more. Observation of a cross section of the resulting hollow fiber showed that it had a five-layer structure ($A_o$ $B_o$ C $B_i$ $A_i$) characteristic of the present invention. The inner void layer-to-outer void layer ratio was found to be 1.3. Scanning electron microphotographs of the resulting hollow fiber are given in FIGS. 2 to 9.

The relationship between the radius of the Cp pore and the distance from the inner surface of the resulting hollow fiber is designated by a curve —x— in FIG. 10.

Another hollow fiber was prepared in substantially the same manner as mentioned above except that dimethylacetamide, tetraethylene glycol and a polysulfone (Udel) were mixed in a weight ratio of 74:9:17. The relationship between the radius of the Cp pore and the distance from the inner surface of the resulting hollow fiber is designated by a curve —o— in FIG. 10.

EXAMPLES 2 TO 13

Hollow fibers were prepared in substantially the same manner as in Example 1 except that the kind of the additive was varied as indicated in Table 2. The additives employed and the properties of the resulting hollow fibers are shown in Table 2. Observation of a cross section of each of the thus obtained hollow fibers showed that each hollow fiber had a five-layer structure characteristic of the present invention, and the inner void layer-to-outer void layer ratio of each hollow fiber was found to be of from 1.0 to 1.3.

The resulting porous flat membrane had the following properties: water permeability, 0.01 $m^3/m^2$.day.atm.water at 25° C.; modulus of elasticity, 1311 $kg/cm^2$; tensile strength, 60 $kg/cm^2$ or less. The scanning electron microphotograph of a cross section of the thus obtained flat membrane showed that the membrane had an ABC-composed three-layer structure. By using the polymer solution having the same composition as mentioned above, flat membranes of various thicknesses were prepared in substantially the same manner as mentioned above. The relationship between the water permeability and the thickness of the resulting flat membrane is shown in FIG. 14. Each of the thus obtained flat membranes had an ABC-composed three-layer structure.

COMPARATIVE EXAMPLES 2 AND 3

10 g of a polysulfone (Udel) and 90 g of N-methylpyrrolidone were mixed at 30° C. to obtain a homogeneous polymer solution. The thus obtained polymer solution was cast with a doctor blade onto a glass plate to form a membrane of 250 μm in thickness and the membrane was then dipped into water to effect coagulation. The resulting porous flat membrane had the following properties: membrane thickness, 100 μm; water permeability, 5$m^3/m^2$.day.atm.water at 25° C.; modulus of elasticity, 238 $kg/cm^2$; tensile strength, 10 $kg/cm^2$ or less. The thus obtained flat membrane had an AB-composed double-layer structure.

The polymer solution having the same composition as mentioned just above was extruded from an annular hollow fiber spinning nozzle (330 μm) into an air space.

TABLE 2

| Example No. | Additive | Inner Diameter, mm | Outer Diameter, mm | Membrane Thickness, mm | Burst Strength, $kg/cm^2$ | Water[3] Permeability | T-10[2] | T-40[2] | T-70[2] | Modulus of Elasticity, $kg/cm^2$ | Tensile Strength, $kg/cm^2$ |
| --- | --- | --- | --- | --- | --- | --- | --- | --- | --- | --- | --- |
| 2 | ethylene glycol | 0.75 | 1.37 | 0.31 | 25 | 6 | 4 | 41 | 70 | 1525 | 60 |
| 3 | diethylene glycol | 0.75 | 1.43 | 0.34 | 25 | 7 | 22 | 79 | 82 | 1500 | 60 |
| 4 | triethylene glycol | 0.74 | 1.48 | 0.37 | 25 | 6 | 19 | 78 | 81 | 1549 | 60 |
| 5 | tetraethylene glycol | 0.75 | 1.35 | 0.30 | 31 | 12 | 24 | 80 | 82 | 1631 | 61 |
| 6 | polyethylene glycol 200[1] | 0.75 | 1.40 | 0.33 | 25 | 8 | 15 | 79 | 80 | 1520 | 60 |
| 7 | polyethylene glycol 600[1] | 0.74 | 1.70 | 0.48 | 23 | 4 | 30 | 75 | 80 | 1619 | 71 |
| 8 | polyethylene glycol 1000[1] | 0.75 | 1.75 | 0.50 | 21 | 4 | 30 | 70 | 75 | 1721 | 73 |
| 9 | polyethylene glycol 2000[1] | 0.76 | 1.76 | 0.50 | 20 | 5 | 2 | 40 | 70 | 1713 | 74 |
| 10 | propylene glycol | 0.72 | 1.43 | 0.36 | 22 | 7 | 15 | 64 | 82 | 1538 | 55 |
| 11 | dipropylene glycol | 0.73 | 1.47 | 0.37 | 23 | 7 | 17 | 74 | 80 | 1520 | 59 |
| 12 | tripropylene glycol | 0.75 | 1.49 | 0.37 | 21 | 7 | 18 | 74 | 80 | 1671 | 63 |
| 13 | polyethylene glycol 400[1] | 0.75 | 1.35 | 0.30 | 25 | 7 | 9 | 40 | 70 | 1538 | 69 |

Note:
[1]: Average Molecular weight
[2]: proportions cut-off (%) of dextran T-10 having an average molecular weight of $1 \times 10^4$, dextran T-40 having an average molecular weight of $4 \times 10^4$, dextran T-70 having an average molecular weight of $7 \times 10^4$
[3]: Water permeability : $m^3/m^2 \cdot day \cdot atm \cdot water$ at 25° C.

COMPARATIVE EXAMPLE 1

The polymer solution having the same composition as mentioned in Example 1 was, at a temperature of 25° C., cast with a doctor blade onto a glass plate to form a membrane of 400 μm in thickness, and the membrane was, after allowed to stand for one minute, dipped into 25° C. water to effect coagulation. As a result, there was obtained a porous flat membrane of 300 μm in thickness.

Water was employed as the internal coagulating liquid to effect coagulation of the inside of the resulting extrudate. Thus, a hollow fiber of 0.75 mm in inner diameter, 1.35 mm in outer diameter and 0.3 mm in membrane thickness was prepared. The running-in-air distance was 1.5 cm. The resulting hollow fiber had the following properties: water permeability, 5 $m^3/m^2$.day.atm.water at 25° C.; burst strength, 13 kg/cm$^2$; tensile strength, 10 kg/cm$^2$; modulus of elasticity, 252 kg/cm$^2$. The scanning electron microphotograph of a cross section of the thus obtained hollow fiber membrane showed that the hollow fiber did not have a five-layer structure characteristic of the present invention.

COMPARATIVE EXAMPLES 4 AND 5

20 g of a polysulfone (Udel) as the polymer and 80 g of dimethylacetamide as the solvent were mixed to obtain a homogeneous polymer solution. The thus obtained polymer solution was, at a temperature of 25° C., cast with a doctor blade onto a glass plate to form a membrane of 350 μm in thickness, and the membrane was, after allowed to stand for one minute, dipped into 25° C. water to effect coagulation.

The resulting porous flat membrane was 300 μm in thickness and 0.005 m$^3$/m$^2$.day.atm.water at 25° C. in water permeability and had an ABC-composed three-layer structure.

The polymer solution having the same composition as mentioned above was spun into a hollow fiber under the same spinning conditions as mentioned in Example 1. The resulting hollow fiber was 0.75 mm in inner diameter, 1.35 mm in outer diameter and 0.3 mm in thickness, and had a water permeability of 0.01 m$^3$/m$^2$.day.atm.water at 25° C., a burst strength of 21 kg/cm$^2$, a tensile strength of 55 kg/cm$^2$ and a modulus of elasticity of 1521 kg/cm$^2$. The thus obtained hollow fiber had an $A_oB_oCB_iA_i$-composed five-layer structure, but it was not a structure characteristic of the present inventon. The inner void layer-to-outer void layer ratio was found to be 1.7.

COMPARATIVE EXAMPLE 6

Udel as the polysulfone, dimethylacetamide as the solvent and tetraethylene glycol as the additive were mixed in a weight ratio of 10:81:9 to obtain a homogeneous polymer solution. The thus obtained polymer solution was cast with a doctor blade onto a glass plate to form a membrane and the membrane was, after allowed to stand for one minute, dipped into 25° C. water to effect coagulation. The resulting porous flat membrane was 300 μm in thickness, 5 m$^3$/m$^2$.day.atm.water at 25° C. in water permeability, 215 kg/cm$^2$ in modulus of elasticity and 9 kg/cm$^2$ in tensile strength. The resulting flat membrane had an AB-composed double-layer structure.

COMPARATIVE EXAMPLE 7

80 ml of an aqueous 50 wt % sodium nitrate solution was incorporated in a mixed solvent comprised of 2620 ml of dimethylacetamide and 1300 ml of dimethylsulfoxide, and further, 750 g of a polysulfone (Udel) as employed in Example 1 was dissolved therein, whereby a homogeneous polymer solution was prepared. The thus obtained polymer solution was spun into a hollow fiber semipermeable membrane in substantially the same manner as in Example 1. The resulting hollow fiber was 0.75 mm in inner diameter, 1.35 mm in outer diameter and 1.0 m$^3$/m$^2$.day.atm.water at 25° C. in water permeability and had a burst strength of 15 kg/cm$^2$, a modulus of elasticity of 821 kg/cm$^2$ and a tensile strength of 30 kg/cm$^2$. The proportion cut-off of dextran molecules having an average molecular weight of $7 \times 10^4$ was 48%. The resulting hollow fiber had an $A_oB_oCB_iA_i$-composed five-layer structure, but the inner void layer-to-outer void layer ratio was as large as 1.7.

The polymer solution having the same composition as mentioned just above was spun into hollow fiber membranes with various membrane thicknesses. The relationship between the water permeability and the membrane thickness is designated by a curve —●— in FIG. 11.

EXAMPLE 14

A polysulfone (Udel), dimethylacetamide and tetraethylene glycol were mixed in a weight ratio of 20:71:9 to obtain a homogeneous polymer solution. The thus obtained polymer solution was spun into a hollow fiber under the same spinning conditions as mentioned in Example 1 except that the orifice diameter of the annular spinning nozzle was varied. Thus, hollow fiber membranes of various outer diameters and various membrane thicknesses were obtained. The inner diameter of each of the resulting hollow fibers membranes was 0.75 mm.

Each of the resulting hollow fiber membranes had a five-layer structure characteristic of the present invention in which the inner void layer-to-outer void layer ratio was in the range of 1.0 to 1.3, and was excellent in burst strength, modulus of elasticity and tensile strength. The relationship between the water permeability and the membrane thickness is designated by a curve —○— in FIG. 11. A polysulfone (Udel), dimethylacetamide and tetraethylene glycol were mixed in a weight ratio of 15:70:15 to obtain a homogeneous polymer solution. The thus obtained polymer solution was spun into hollow fibers in the same manner as mentioned above. The relationship between the membrane thickness and the water permeability is designated by a curve —△— in FIG. 11.

EXAMPLES 15 TO 19

A polysulfone (Udel) as the polymer, tetraethylene glycol as the additive and a solvent were mixed in a weight ratio of 20:71:9, thereby to obtain homogeneous spinning solutions. Each of the so obtained spinning solutions was spun into a hollow fiber under the same spinning conditions as those employed in Example 1. Each of the resulting hollow fibers was 0.75 mm in inner diameter and 1.35 mm in outer diameter. The proportions cut-off of dextran molecules having a various average molecular weights were substantially the same as those obtained in Example 1. The other properties of the resulting hollow fibers are shown in Table 3. Each of the resulting hollow fibers had a five-layer structure ($A_o$ $B_o$ C $B_i$ $A_i$) characteristic of the present invention, and the inner void layer-to-outer void layer ratio was found to be 1.0 to 1.3.

TABLE 3

| Example No. | Solvent (abbreviation) | Water* Permeability | Burst Strength, kg/cm$^2$ | Tensile Strength, kg/cm$^2$ | Modulus of elastisity, kg/cm$^2$ |
|---|---|---|---|---|---|
| 15 | Diethylacetamide (DEAc) | 10 | 30 | 60 | 1630 |
| 16 | Dimethylformamide (DMF) | 10 | 25 | 59 | 1525 |

TABLE 3-continued

| Example No. | Solvent (abbreviation) | Water* Permeability | Burst Strength, kg/cm² | Tensile Strength, kg/cm² | Modulus of elasticity, kg/cm² |
|---|---|---|---|---|---|
| 17 | N—methyl-pyrrolidone (NMP) | 11 | 25 | 58 | 1610 |
| 18 | Tetramethylurea (TMU) | 9 | 25 | 58 | 1521 |
| 19 | Dimethylacetamide/ N—methylpyrrolidone mixed solvent (DMAc/NMP) | 8 | 27 | 57 | 1599 |

Note:
*Water permeability: m³/m² · day · atm · water at 25° C.

EXAMPLES 20 TO 23 AND COMPARATIVE EXAMPLE 8

Dimethylacetamide (hereinafter often abbreviated as "DMAc") was used as a solvent for a polysulfone and tetraethylene glycol (hereinafter often abbreviated as "TEG") was used as the additive. A polysulfone (Udel) and DMAc were mixed in varied weight proportions, whereby spinning solutions with various polysulfone concentrations were prepared. Each of the resulting spinning solutions was spun into hollow fibers in substantially the same manner as in Example 1. Each of the thus obtained hollow fibers was 0.75 mm in inner diameter, 1.35 mm in outer diameter and 0.3 mm in thickness. The properties of the thus obtained hollow fibers are shown in Table 4. Each of the resulting hollow fibers had an $A_oB_oC\ A_iB_i$-composed five-layer structure, but only the hollow fiber obtained in Comparative Example 8 had a C layer having such a small thickness as 2 μm. Further, the C layer of the hollow fiber obtained in Comparative Example 8 was non-uniform and disorders were observed in each of the void layers ($B_i$ layer, $B_o$ layer) at a portion where the void layer was contiguous to the C layer. Each of the hollow fibers obtained in Examples 20 to 23 had a C layer having a thickness of 10 to 70 μm, which was larger than that of the C layer of the hollow fiber obtained in Comparative Example 8. Further, each of the hollow fibers obtained in Examples 20 to 23 had uniform polymer phases in the void layers and C layer, and had an inner void layer-to-outer void layer ratio of 1.0 to 1.4.

TABLE 4

| No. | Polysulfone, wt % | DMAc, wt % | TEG, wt % | Water Permeability* | Burst Strength, kg/cm² | Tensile Strength, kg/cm² | Modulus of Elasticity, kg/cm² |
|---|---|---|---|---|---|---|---|
| Comparative Example 8 | 10 | 75 | 15 | 32 | 10 | 5 | 212 |
| Example 20 | 15 | 70 | 15 | 30 | 22 | 21 | 813 |
| Example 21 | 20 | 65 | 15 | 13 | 28 | 55 | 1500 |
| Example 22 | 25 | 60 | 15 | 5 | 37 | 83 | 2200 |
| Example 23 | 30 | 55 | 15 | 3 | 45 | 110 | 3100 |

Note:
*Water permeability: m³/m² · day · atm · water at 25° C.

EXAMPLES 24 TO 29 AND COMPARATIVE EXAMPLES 9 AND 10

A polysulfone (Udel), DMAc and TEG were mixed in a weight ratio of 20:71:9 to obtain a homogeneous polymer solution. The thus obtained polymer solution was extruded from an annular spinning nozzle. Purified water was used as the internal and external coagulating liquids to effect coagulation of both the inside and outside of the resulting extrudate. The running-in-air distance which is a distance between the tip of the spinning nozzle and the surface of the external coagulating liquid was varied. As a result, porous hollow fiber membranes were obtained. The properties of the thus obtained hollow fibers were examined and the results obtained are shown in Table 5. Each of the hollow fibers obtained in Examples 24 to 29 and Comparative Example 9 was 1.35 mm in outer diameter, 0.75 mm in inner diameter and 0.3 mm in thickness. Each of the hollow fibers thus obtained had a five-layer structure ($A_o\ B_o\ C\ B_i\ A_i$), but the hollow fiber obtained in Comparative Example 9 had an inner void layer-to-outer void layer ratio of as large as 2.0, and further, had a C layer having a thickness as large as 82 μm. In the case of Comparative Example 10 in which a too long running-in-air distance was employed, the resulting membrane was not a hollow fiber. The C layer of each of the hollow fibers obtained in Examples 24 to 29 had a thickness of 5 to 70 μm.

TABLE 5

| No. | Running-in-air distance, cm | Burst Strength, kg/cm² | Water Permeability* | Tensile Strength, kg/cm² | Modulus of elasticity, kg/cm² | Inner void layer-to-outer void layer ratio | Remarks |
|---|---|---|---|---|---|---|---|
| Comparative Example 9 | 0 | 24 | 2.8 | 50 | 1265 | 2.0 | |
| Example 24 | 1 | 27 | 8 | 53 | 1320 | 1.3 | |
| Example 25 | 1.5 | 31 | 12 | 61 | 1637 | 1.2 | |
| Example 26 | 2.0 | 24 | 10 | 55 | 1418 | 1.1 | |
| Example 27 | 3.0 | 17 | 8 | 51 | 1100 | 0.9 | |
| Example 28 | 4.0 | 15 | 7 | 48 | 1050 | 1.0 | |

TABLE 5-continued

| No. | Running-in-air distance, cm | Burst Strength, kg/cm² | Water Permeability* | Tensile Strength, kg/cm² | Modulus of elasticity, kg/cm² | Inner void layer-to-outer void layer ratio | Remarks |
|---|---|---|---|---|---|---|---|
| Example 29 | 12.0 | 15 | 7 | 32 | 900 | 1.5 | |
| Comparative Example 10 | 31.0 | — | — | — | — | — | Membrane obtained was not a hollow fiber |

Note:
*Water permeability: m³/m² · day · atm · water at 25° C.

EXAMPLES 30 AND 31

A spinning solution having the same composition as mentioned in Examples 24 to 29 was extruded from an annular nozzle. Methanol was used as the internal and external coagulating liquids to effect coagulation of both the inside and outside of the resulting extrudate. The running-in-air distance was 1.5 cm. The thus obtained hollow fiber was 0.75 mm in inner diameter and 1.35 mm in outer diameter, and was excellent in burst strength, water permeability, modulus of elasticity and tensile strength. The thus obtained hollow fiber had a five-layer structure characteristic of the present invention.

While, another hollow fiber which was also excellent in burst strength, water permeability, modulus of elasticity and tensile strength was obtained in the same manner as mentioned just above except that water was employed as the external coagulating liquid in place of methanol. The thus obtained hollow fiber had a five-layer structure characteristic of the present invention.

COMPARATIVE EXAMPLE 11

A polyfulfone (Udel), dimethylacetamide and tetraethylene glycol were mixed in a weight ratio of 20:65:15 to obtain a homogeneous polymer solution. The resulting polymer solution was extruded from each of hollow fiber spinning annular nozzles differing in size. Water was employed as the internal and external coagulating liquids to effect coagulation of both sides (coagulation of both the inside and outside) of the resulting extrudate. Thus, there were obtained hollow fibers with various thicknesses. Each hollow fiber had an $A_o B_o C B_i A_i$-composed five-layer structure and had an inner diameter of 0.75 mm. While, hollow fibers with various thicknesses but each having a $B_i A_o$-composed double-layer structure were obtained in the same manner as mentioned above except that water as the internal coagulating liquid was replaced by air. On the other hand, hollow fibers with various thicknesses but each having an $A_i B_o$-composed double-layer structure were obtained in the same manner as mentioned above except that water as the external coagulating liquid was replaced by air. The thus obtained hollow fibers were examined with respect to the burst strength, and the results obtained are shown in FIG. 15.

EXAMPLE 32

Dimethylacetamide (DMAc) as the solvent, tetraethylene glycol (TEG) as the additive and VICTREX (tradename of a polyether sulfone manufactured and sold by ICI Company, England) comprising recurring units represented by the formula:

$$\text{\textemdash O\textemdash\hspace{-1pt}\raisebox{-2pt}{\includegraphics}}\text{\textemdash SO}_2\text{\textemdash\hspace{-1pt}\raisebox{-2pt}{\includegraphics}}\text{\textemdash}$$

as the polymer were mixed in a weight ratio of 65:15:20 to obtain a homogeneous polymer solution. The thus obtained polymer solution was used as the spinning solution. The spinning solution was then extruded from an annular hollow fiber spinning nozzle (330 μm). Purified water was used as the internal and external coagulating liquids to effect coagulation of both the inside and outside of the resulting extrudate. As a result, there was obtained a porous membrane in the form of a hollow fiber having an inner diameter of 0.75 mm, an outer diameter of 1.35 mm and a membrane thickness of 0.3 mm. The running-in-air distance, which is a distance between the tip of the spinning nozzle and the surface of the external coagulating liquid was 1.5 cm.

The thus obtained hollow fiber had following properties: water permeability, 15 m³/m².day.atm.water at 25° C.; burst strength, 33 kg/cm²; modulus in tension, 1700 kg/cm²; tensile strength, 70 kg/cm². The proportions cut-off of dextran molecules having an average molecular weight of $1 \times 10^4$, $4 \times 10^4$ and $7 \times 10^4$ were 20.0%, 65.0% and 82.0%, respectively. The resulting hollow fiber had a five-layer structure characteristic of the present invention, and the inner void layer-to-outer void layer ratio was found to be 1.3.

EXAMPLES 33 TO 44

Hollow fibers were prepared in substantially the same manner as in Example 32 except that the kind of the additive was varied. The additives employed and the properties of the resulting hollow fibers are shown in Table 6. Each of the thus obtained hollow fibers had a five-layer structure characteristic of the present invention and the inner void layer-to-outer void layer ratio was found to be 1.0 to 1.5.

TABLE 6

| Example No. | Additive | Inner Diameter, mm | Outer Diameter, mm | Membrane Thickness, mm | Burst Strength, kg/cm² | Water[3] Permeability | T-10[2] | T-40[2] | T-70[2] | Modulus of Elasticity, kg/cm² | Tensile Strength, kg/cm² |
|---|---|---|---|---|---|---|---|---|---|---|---|
| 33 | ethylene glycol | 0.75 | 1.35 | 0.3 | 30 | 7.2 | 4 | 35 | 70 | 1588 | 65 |
| 34 | diethylene | " | 1.35 | 0.3 | 31 | 8.4 | 18 | 68 | 82 | 1563 | 65 |

TABLE 6-continued

| Example No. | Additive | Inner Diameter, mm | Outer Diameter, mm | Membrane Thickness, mm | Burst Strength, kg/cm$^2$ | Water[3] Permeability | T-10[2] | T-40[2] | T-70[2] | Modulus of Elasticity, kg/cm$^2$ | Tensile Strength, kg/cm$^2$ |
|---|---|---|---|---|---|---|---|---|---|---|---|
| 35 | triethylene glycol | " | 1.35 | 0.3 | 30 | 10.0 | 15 | 67 | 83 | 1612 | 65 |
| 36 | tetraethylene glycol | " | 1.35 | 0.3 | 33 | 15.0 | 20 | 65 | 82 | 1700 | 70 |
| 37 | polyethylene glycol 200[1] | " | 1.35 | 0.3 | 30 | 13.0 | 23 | 79 | 80 | 1583 | 63 |
| 38 | polyethylene glycol 600[1] | " | 1.75 | 0.5 | 35 | 4.8 | 20 | 70 | 79 | 1742 | 75 |
| 39 | polyethylene glycol 1000[1] | " | 1.75 | 0.5 | 30 | 4.8 | 25 | 62 | 82 | 1884 | 74 |
| 40 | polyethylene glycol 2000[1] | " | 1.75 | 0.5 | 28 | 6.0 | 4 | 30 | 70 | 1887 | 77 |
| 41 | propylene glycol | " | 1.47 | 0.36 | 27 | 8.2 | 12 | 55 | 80 | 1822 | 59 |
| 42 | dipropylene glycol | " | 1.55 | 0.40 | 28 | 8.5 | 15 | 59 | 77 | 1584 | 62 |
| 43 | tripropylene glycol | " | 1.55 | 0.40 | 26 | 8.6 | 18 | 69 | 82 | 1698 | 67 |
| 44 | polyethylene glycol 400[1] | " | 1.35 | 0.30 | 28 | 8.7 | 20 | 35 | 78 | 1533 | 73 |

Note
[1]: Average molecular weight
[2]: Proportions cut-off (%) of dextran T-10 having an average molecular weight of $1 \times 10^4$, dextran T-40 having an average molecular weight of $4 \times 10^4$ and dextran T-70 having an average molecular weight of $7 \times 10^4$
[3]: Water permeability (m$^3$/m$^2$ · day · atm · water at 25° C.)

COMPARATIVE EXAMPLE 12

The polymer solution having the same composition as mentioned in Example 32 was, at a temperature of 25° C., cast with a doctor blade onto a glass plate to form a membrane of 400 μm in thickness, and the membrane was, after allowed to stand for one minute, dipped into 25° C. water to effect coagulation. As a result, there was obtained a porous flat membrane of 300 μm in thickness and of 0.001 m$^3$/m$^2$.day.atm.water at 25° C. in water permeability. The resulting flat membrane had an ABC-composed three-layer structure.

COMPARATIVE EXAMPLES 13 AND 14

10 g of a polyether sulfone (VICTREX) and 90 g of N-methylpyrrolidone were mixed at 30° C. to obtain a homogeneous polymer solution. The thus obtained polymer solution was cast with a doctor blade onto a glass plate to form a membrane of 250 μm in thickness and the membrane was, after allowed to stand for one minute, then dipped into 25° C. water to effect coagulation. The resulting porous flat membrane had the following properties: membrane thickness, 100 μm; water permeability, 5 m$^3$/m$^2$.day.atm.water at 25° C.; modulus of elasticity, 221 kg/cm$^2$; tensile strength, 10 kg/cm$^2$ or less. The thus obtained flat membrane had an AB-composed double-layer structure.

The polymer solution having the same composition as mentioned just above was extruded into an air space from an annular hollow fiber spinning nozzle. Water was employed as the internal cagulating liquid to effect coagulation of the inside of the resulting extrudate. Thus, a hollow fiber was obtained.

The resulting hollow fiber membrane was 0.75 mm in inner diameter, 1.35 mm in outer diameter, 0.3 mm in thickness and 5 m$^3$/m$^2$.day.atm.water at 25° C. in water permeability and had a modulus of elasticity of 323 kg/cm$^2$, a tensile strength of 10 kg/cm$^2$ and a burst strength of 10 kg/cm$^2$ or less. Observation of a cross section of the resulting hollow fiber by using a scanning type electron microscope showed that the resulting hollow fiber did not have a five-layer structure characteristic of the present invention.

COMPARATIVE EXAMPLES 15 AND 16

20 g of a polyether sulfone (VICTREX) as the polymer and 80 g of dimethylacetamide as the solvent were mixed to obtain a homogeneous polymer solution. The thus obtained polymer solution was, at a temperature of 25° C., cast with a doctor blade onto a glass plate to form a membrane of 400 μm in thickness and the membrane was, after allowed to stand for one minute, dipped into 25° C. water to effect coagulation.

The resulting porous flat membrane was 300 μm in thickness and 0.005 m$^3$/m$^2$.day.atm.water at 25° C. in water permeability. The thus obtained porous flat membrane had an ABC-composed three-layer structure.

By using the polymer solution having the same composition as mentioned above, a hollow fiber was prepared in the same manner as in Example 32. The resulting hollow fiber was 0.75 mm in inner diameter, 1.35 mm in outer diameter, 0.3 mm in thickness, 0.01 m$^3$/m$^2$.day.atm.water at 25° C. in water permeability and 30 kg/cm$^2$ in burst strength. The thus obtained hollow fiber had an inner void layer-to-outer void layer ratio of 1.7, and did not have a five-layer structure characteristic of the present invention.

EXAMPLE 45

Hollow fiber membranes were prepared in substantially the same manner as in Example 32 except that various annular nozzles were employed. Thus, hollow fiber membranes of various outer diameters were obtained. Each of the thus obtained hollow fiber membranes had an inner diameter of 0.75 mm. The relationship between the water permeability and the membrane thickness is shown in FIG. 12. Each of the resulting hollow fiber membranes had a five-layer structure characteristic of the present invention, and had an inner void layer-to-outer void layer ratio of 1.3.

COMPARATIVE EXAMPLE 17

An aqueous 30% sodium sulfite solution was incorporated into 490 ml of dimethylsulfoxide to obtain a homogeneous solution. 125 g of a polyether sulfone (VICTREX) was dissolved in the thus obtained solution, whereby a polymer solution was prepared. The viscosity of the polymer solution was 1,900 centipoises(at a temperature of 20° C.). The polymer solution was extruded from an annular hollow fiber spinnihg nozzle (330μm). Water was used as the internal and external coagulating liquids, whereby coagulation of both the inside and outside of the resulting extrudate was effected.

The resulting hollow fiber was 0.75 mm in inner diameter, 1.35 mm in outer diameter, 2 m$^3$/m$^2$.day.atm.water at 25° C. in water permeability and 14 kg/cm$^2$ in burst strength. The proportion cutoff of dextran molecules having a molecular weight of 70,000 was 70.0%. The resulting hollow fiber membrane had a five-layer structure, but the inner void layer-to-outer void layer ratio was as large as 1.7.

EXAMPLES 46 TO 50

A polyether sulfone (VICTREX), tetraethylene glycol and a solvent as indicated in Table 7 were mixed in a weight ratio of 20:65:15 to obtain polymer solutions. Each of the thus obtained polymer solutions were spun into a hollow fiber which was 0.75 mm in inner diameter and 1.35 mm in outer diameter in substantially the same manner as in Example 32.

The properties of the so obtained hollow fibers are shown in Table 7. Each of the resulting hollow fiber membranes had a five-layer structure characteristic of the present invention and the inner void layer-to-outer void layer ratio of each hollow fiber was found to be in the range of 1.0 to 1.3.

TABLE 7

| Example No. | Solvent | Water Permeability* | Burst Strength, kg/cm$^2$ | Modulus of Elasticity, kg/cm$^2$ | Tensile Strength, kg/cm$^2$ |
|---|---|---|---|---|---|
| 46 | Diethylacetamide (DEAc) | 11 | 33 | 1674 | 71 |
| 47 | Dimethylformamide (DMF) | 11 | 29 | 1523 | 66 |
| 48 | N—methylpyrrolidone (NMP) | 12 | 28 | 1682 | 63 |
| 49 | Tetramethylurea (TMU) | 10 | 29 | 1599 | 59 |
| 50 | DMAc/NMP | 9 | 32 | 1623 | 61 |

Note:
*Water Permeability: m$^3$/m$^2$ · day · atm · water at 25° C.

EXAMPLES 51 TO 54 AND COMPARATIVE EXAMPLE 18

DMAc was used as a solvent for a polyether sulfone and TEG was used as the additive. A polyether sulfone and DMAc were mixed in varied weight proportions, whereby spinning solutions with various polyether sulfone concentrations were prepared. Each of the thus obtained spinning solutions was spun into a hollow fiber in substantially the same manner as in Example 32. As a result, hollow fibers each having an inner diameter of 0.75 mm, an outer diameter of 1.35 mm and a membrane thickness of 0.3 mm were obtained. The properties of each of the resulting hollow fibers are shown in Table 8. Each of the hollow fiber membranes obtained in Examples 51 to 54 had a five-layer structure characteristic of the present invention and had an inner void layer-to-outer void layer ratio of 1.0 to 1.5. The hollow fiber obtained in Comparative Example 18 had a nonuniform C layer of which the thickness was as small as 2 μm. Further, disorders were observed in each of the void layers (B$_i$ layer, B$_o$ layer) at a portion where the void layer was contiguous to the C layer. The C layer of each of the hollow fibers obtained in Examples 51 to 54 had a thickness of 10 to 70 μm, which was larger than that of the hollow fiber obtained in Comparative Example 18. Each of the hollow fibers obtained in Examples 51 to 54 had uniform polymer phases in the void layers and C layer.

TABLE 8

| Example No. | Polyether Sulfone, wt % | DMAc, wt % | TEG, wt % | Water Permeability* | Burst Strength, kg/cm$^2$ | Tensile Strength, kg/cm$^2$ | Modulus of Elasticity, kg/cm$^2$ |
|---|---|---|---|---|---|---|---|
| Comparative Example 18 | 10 | 75 | 15 | 50 | 9 | 5 | 202 |
| Example 51 | 15 | 70 | 15 | 45 | 25 | 24 | 814 |
| Example 52 | 20 | 65 | 15 | 20 | 32 | 65 | 1555 |
| Example 53 | 25 | 60 | 15 | 8 | 40 | 95 | 2420 |
| Example 54 | 30 | 55 | 15 | 4 | 50 | 120 | 3500 |

Note:
*Water permeability: m$^3$/m$^2$ · day · atm · water at 25° C.

EXAMPLES 55 TO 60, COMPARATIVE EXAMPLES 19 AND 20

A polyether sulfone (VICTREX), DMAc and TEG were mixed in a weight ratio of 20:71:9 to obtain a homogeneous polymer solution. The thus obtained polymer solution was extruded from an annular nozzle. Purified water was used as the internal and external coagulating liquids, whereby coagulation of both the inside and outside of the resulting extrudate was effected. The running-in-air distance which is a distance between the tip of the spinning nozzle and the surface of the external coagulating liquid was varied. As a result, porous hollow fiber membranes were obtained. Each of the resulting hollow fibers had an inner diameter of 0.75 mm, an outer diameter of 1.35 mm and a membrane thickness of 0.3 mm. The resulting hollow fibers were examined with respect to the properties thereof, and the results obtained are shown in Table 9. Each of the hollow fiber membranes obtained in Examples 55 to 60 had a five-layer structure characteristic of the present invention, but the hollow fiber membranes obtained in Comparative Example 19 had an inner void layer-to-outer void layer ratio of as large as 2.0, and further, the thickness of the C layer of this hollow fiber was as large as 82 μm. In the case of Comparative Example 20 in which a too long running-in-air distance was employed, the resulting membranes was not a hollow fiber. The C layer of each of the hollow fiber membranes obtained in Examples 55 to 60 had a thickness of 5 to 70 μm.

TABLE 9

| No. | Running-in-air distance, cm | Burst Strength, kg/cm$^2$ | Water Permeability* | Tensile Strength, kg/cm$^2$ | Modulus of Elasticity, kg/cm$^2$ | Remarks |
| --- | --- | --- | --- | --- | --- | --- |
| Comparative Example 19 | 0 | 30 | 2 | 53 | 1265 | Inner void layer-to-outer void layer ratio 1.9 |
| Example 55 | 1 | 33 | 15 | 60 | 1400 | Inner void layer-to-outer void layer ratio 1.1 |
| Example 56 | 1.5 | 33 | 15 | 65 | 1700 | Inner void layer-to-outer void layer ratio 1.0 |
| Example 57 | 2.0 | 30 | 11 | 60 | 1530 | Inner void layer-to-outer void layer ratio 1.0 |
| Example 58 | 3.0 | 29 | 9 | 52 | 1230 | Inner void layer-to-outer void layer ratio 1.1 |
| Example 59 | 4.0 | 28 | 5 | 49 | 1120 | Inner void layer-to-outer void layer ratio 1.1 |
| Example 60 | 12.0 | 30 | 9 | 33 | 980 | Inner void layer-to-outer void layer ratio 1.5 |
| Comparative Example 20 | 31.0 | — | — | — | — | Membrane obtained was not a hollow fiber |

Note:
*Water Permeability: m$^3$/m$^2$ · day · atm · water at 25° C.

EXAMPLES 61 AND 62

A spinning solution having the same composition as mentioned in Examples 55 to 60 was extruded from an annular nozzle. Methanol was used as the internal and external coagulating liquids, whereby coagulation of the resulting extrudate was effected. The running-in-air distance was 1.5 cm. The resulting hollow fiber was 0.75 m in inner diameter and 1.35 mm in outer diameter, and excellent in burst strength, water permeability, modulus of elasticity and tensile strength. The hollow fiber had a five-layer structure characteristic of the present invention, and the inner void layer-to-outer void layer ratio was found to be 1.0 to 1.5.

A hollow fiber was prepared in the same manner as mentioned above except that water was employed as the external coagulating liquid in place of methanol. The thus obtained hollow fiber was excellent in burst strength, water permeability, modulus of elasticity and tensile strength. The hollow fiber had a five-layer structure characteristic of the present invention, and the inner void layer-to-outer void layer ratio was found to be 1.0 to 1.5

BRIEF DESCRIPTION OF THE DRAWINGS

FIG. 7 is a scanning electron microphotograph (×190 magnification) of a portion of the freeze-broken, oblique cross section of a hollow fiber of the present invention, said portion corresponding to the encircled portion of a diagram given below the photograph.

FIG. 16 is a perspective diagram of a single unit of the Cp pore structure of the intermediate layer of a hollow fiber according to the present invention, shown in comparison with that of a conventional hollow fiber, in which (A) shows that of a hollow fiber of the present invention and (B) shows that of a conventional hollow fiber.

PROBABILITY OF UTILIZATION IN INDUSTRY

Figure 1:
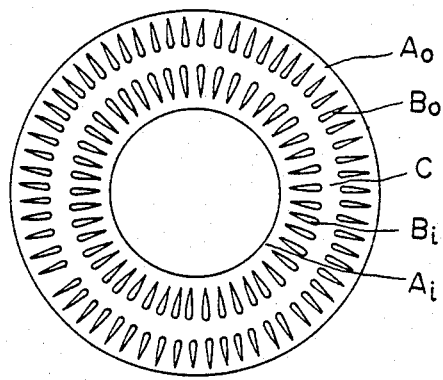
FIG. 1 is a schematic diagram of a cross section of a hollow fiber membrane of the present invention in which the $A_o$, $B_o$, C, $B_i$ and $A_i$ layers are illustrated.
Figure 2:
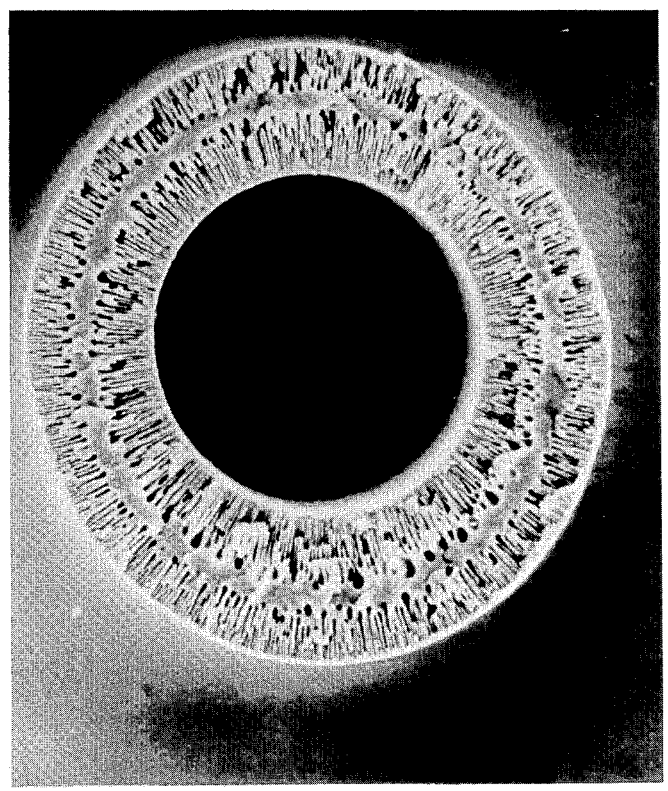
FIG. 2 is a scanning electron microphotograph ($\times 82$ magnification) of a freeze-broken entire cross section of a hollow fiber membrane of the present invention, said cross-section being taken along the plane perpendicular to the fiber axis of said membrane.
Figure 3:
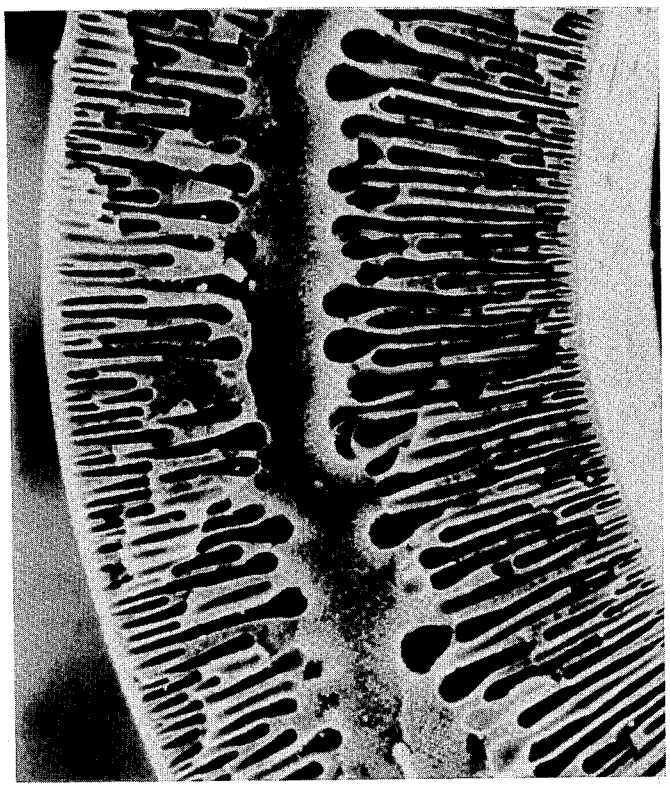
FIG. 3 is a scanning electron microphotograph ($\times 330$ magnification) showing an enlarged view of a portion of the cross section shown in FIG. 2.
Figure 4:
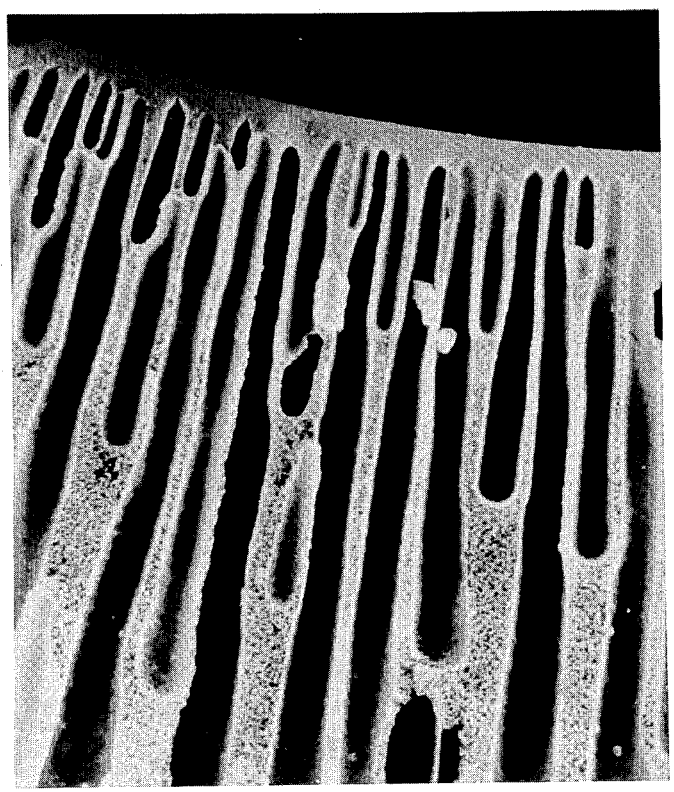
FIG. 4 is a scanning electron microphotograph ($\times 1,400$ magnification) showing an enlarged view of a portion of the cross section shown in FIG. 2, which portion includes part of each of the $A_i$ layer and the $B_i$ layer.
Figure 5:
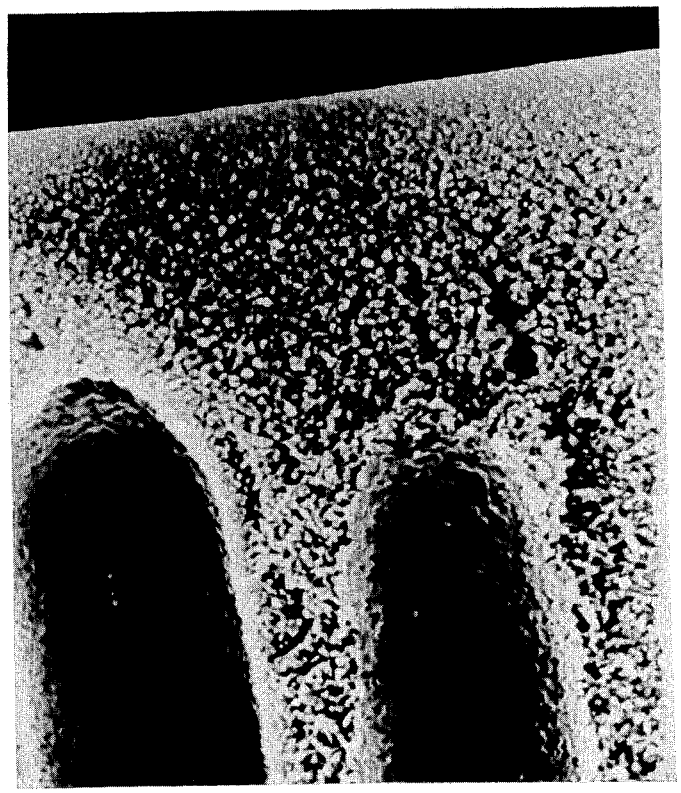
FIG. 5 is a scanning electron microphotograph ($\times 14,000$ magnification) of a portion of the cross section shown in FIG. 2, which portion includes part of the inner surface layer, i.e., the $A_i$ layer.
Figure 6:
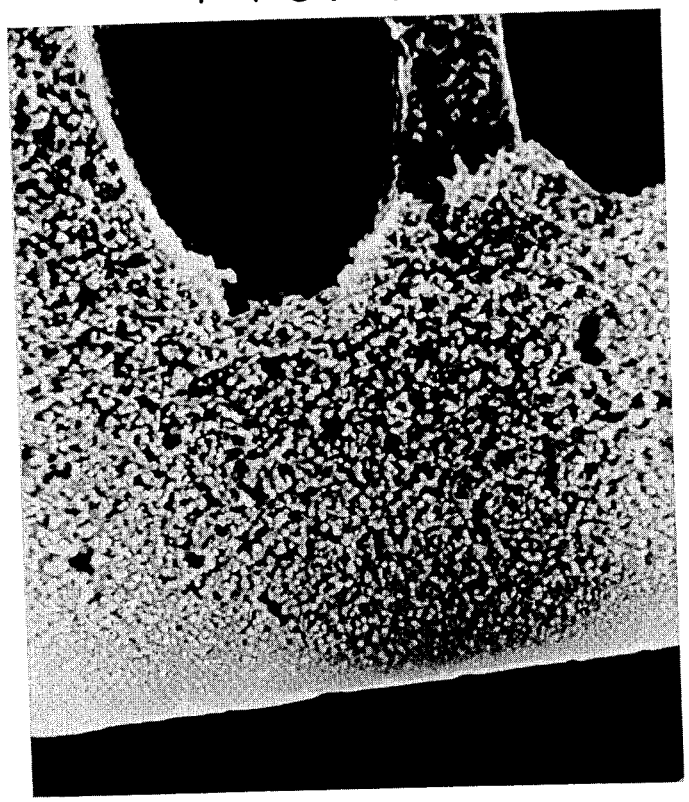
FIG. 6 is a scanning electron microphotograph ($\times 14,000$ magnification) of a portion of the cross section shown in FIG. 2, which portion includes part of the outer surface layer, i.e., the $A_o$ layer.
Figure 8:
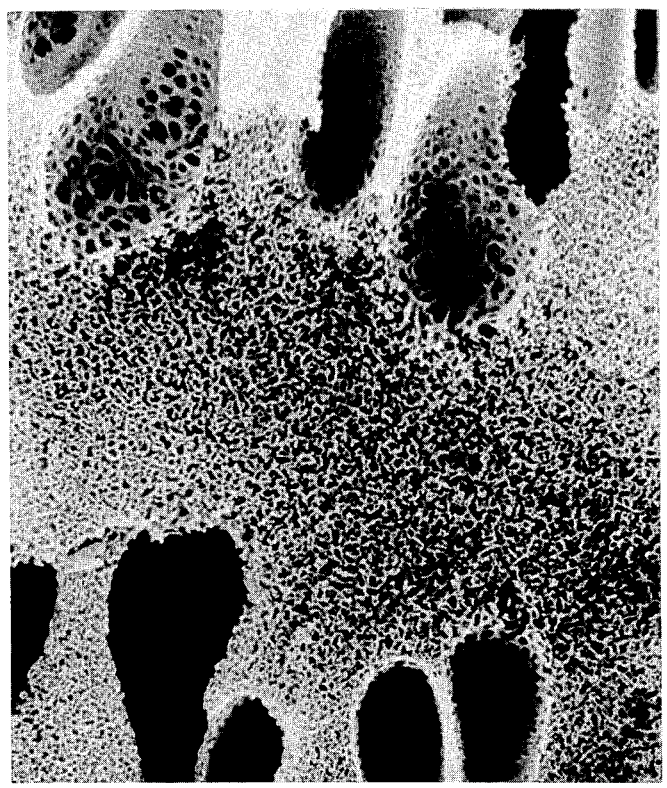
FIG. 8 is a scanning electron microphotograph (×1,400 magnification) of a portion of the cross section shown in FIG. 2, which portion includes part of the intermediate layer (C layer).
Figure 9:
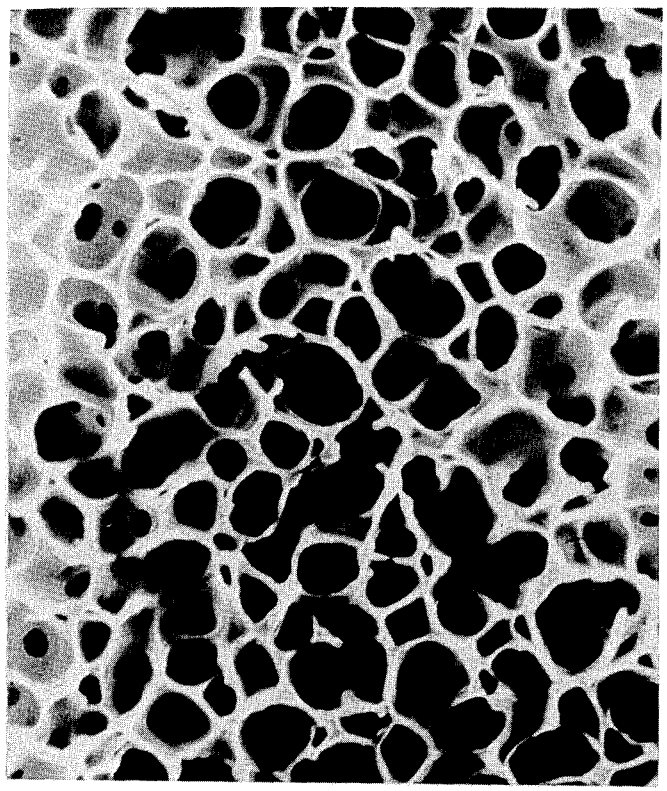
FIG. 9 is a scanning electron microphotograph (×14,000 magnification) showing an enlarged view of the portion shown in FIG. 8.
Figure 10:
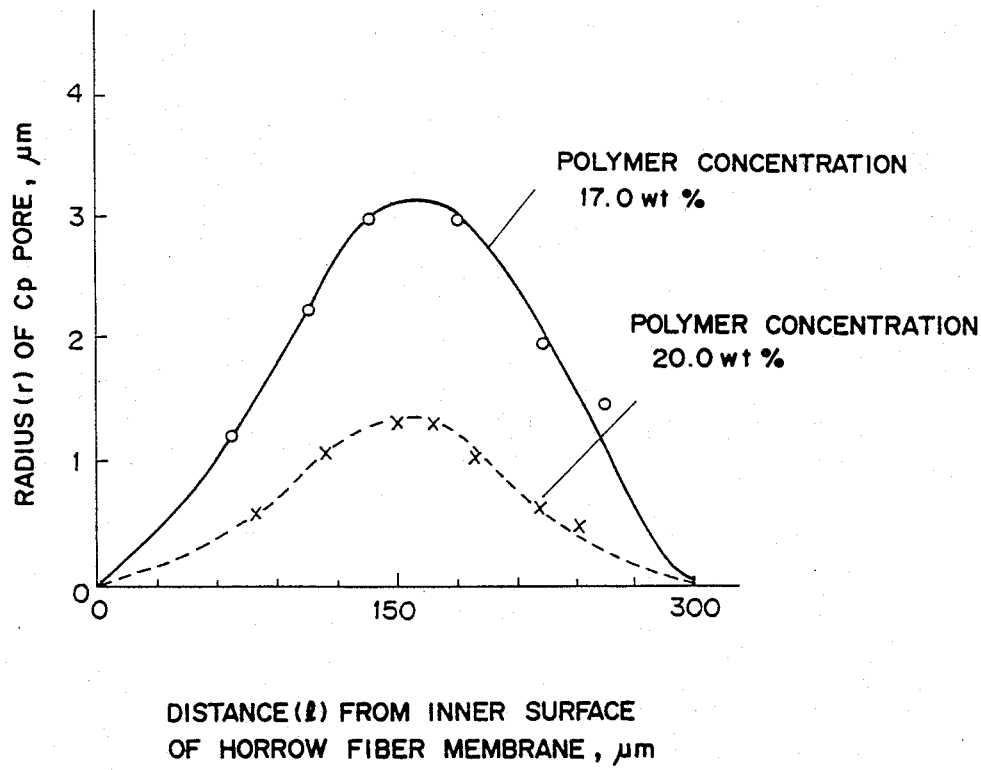
FIG. 10 is composed of curves showing the relationship between the radius of the Cp pore and the distance from the inner surface of a hollow fiber.
Figure 11:
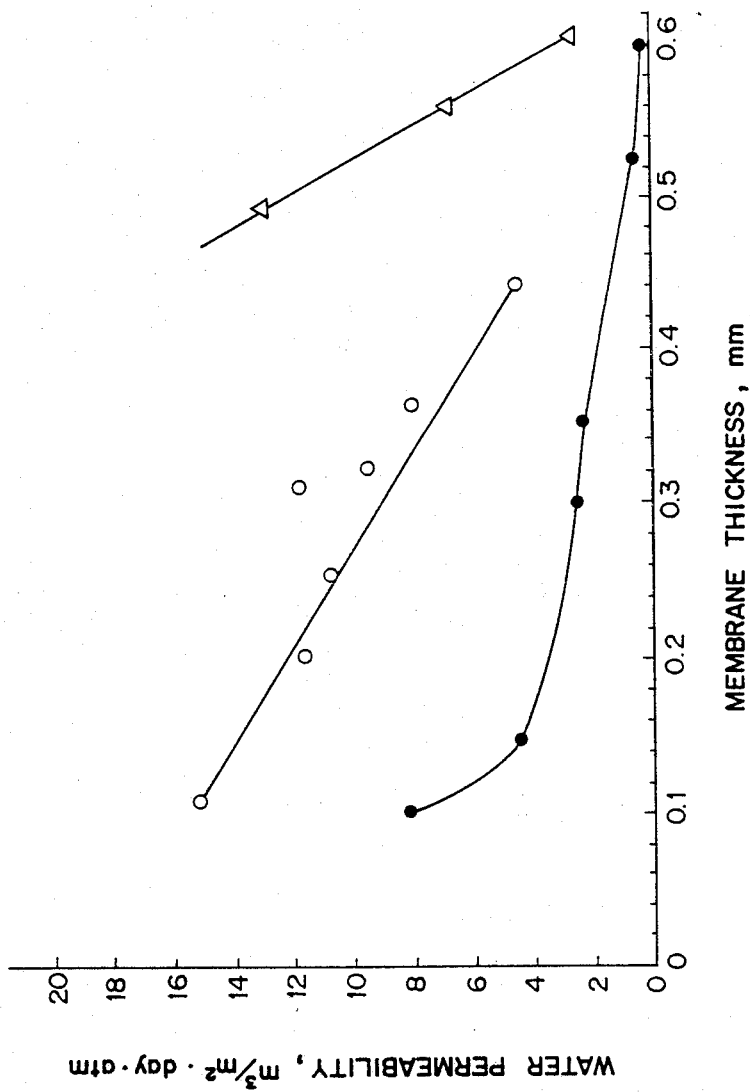
FIG. 11 is composed of graphs showing the relationship between the water permeability and the membrane thickness. The graphs were obtained from the data on aromatic polysulfone hollow fiber membranes obtained by the process of the present invention and on aromatic polysulfone hollow fiber membranes obtained in the Comparative Example.
Figure 12:
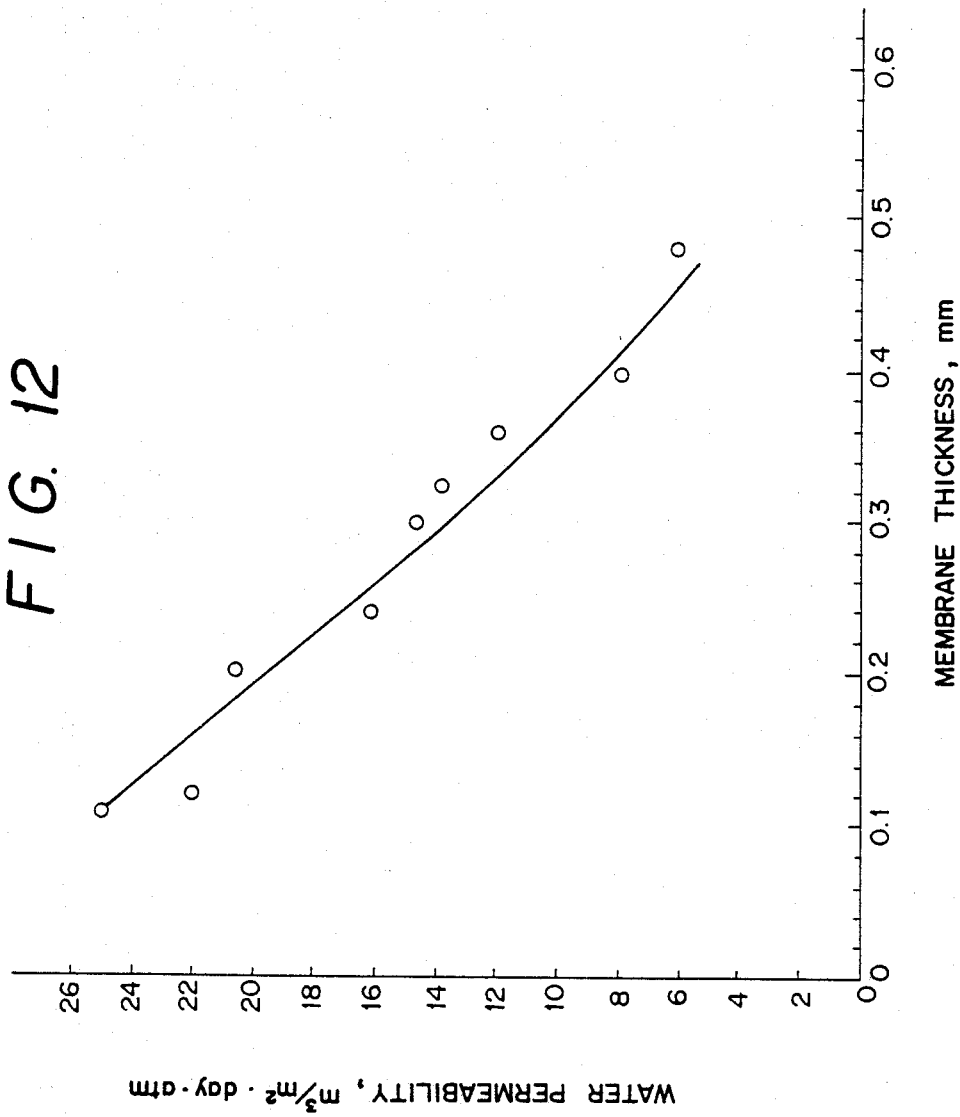
FIG. 12 is a graph showing the relationship between the water permeability and the membrane thickness. The graph was obtained from the data on aromatic polyether sulfone hollow fbber membranes of the present invention.
Figure 13:
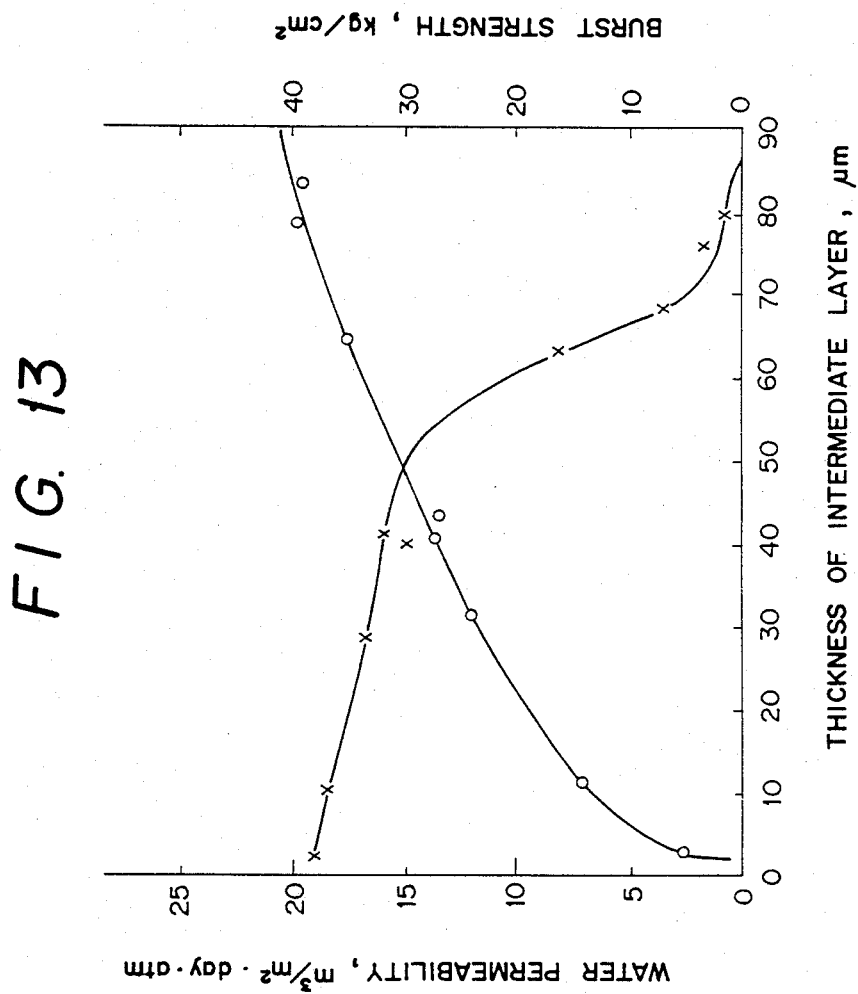
FIG. 13 is composed of curves showing the relationships between the water permeability and the burst strength and the thickness of the intermediate layer. The curves were obtained from the data on hollow fiber membranes of the present invention.
Figure 14:
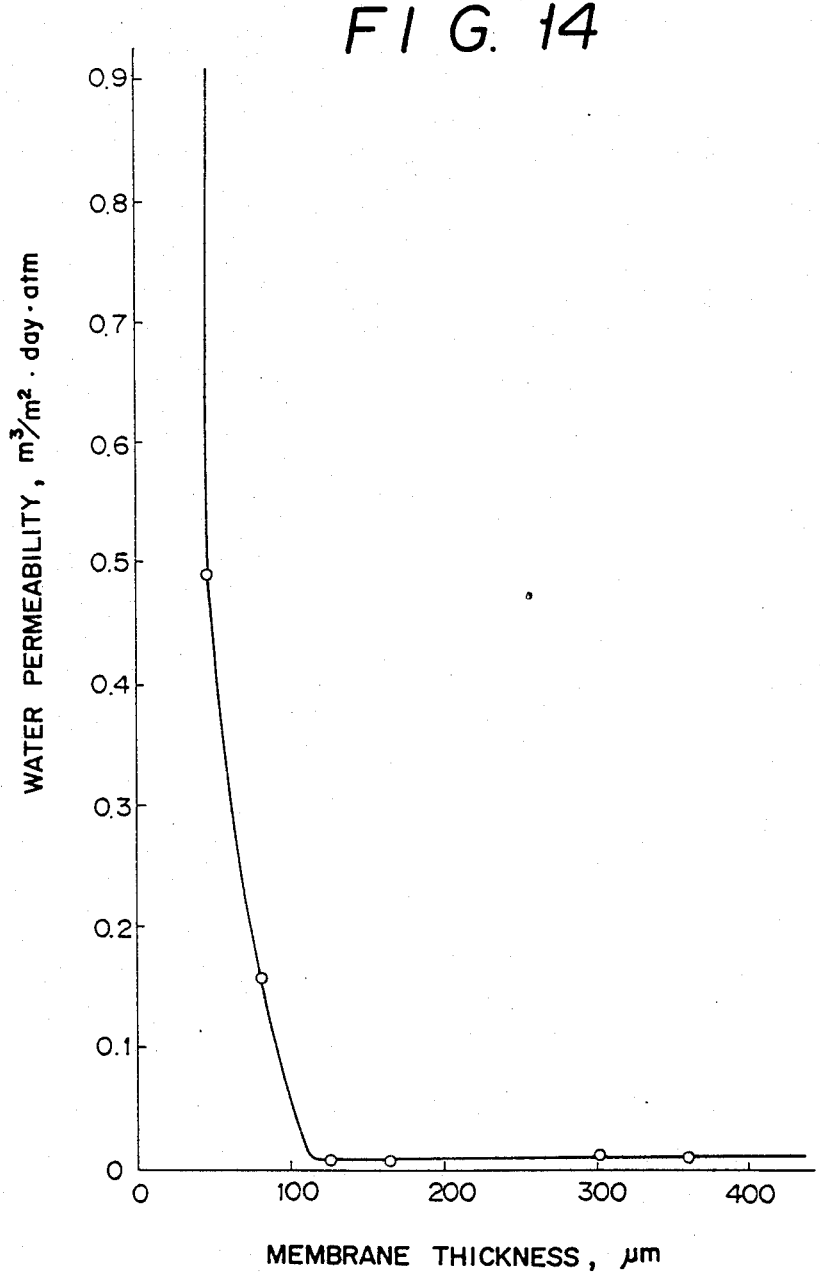
FIG. 14 is a graph showing the relationship between the water permeability and the thickness. The graph was obtained from the data on an ABC-composed flat membrane.
Figure 15:
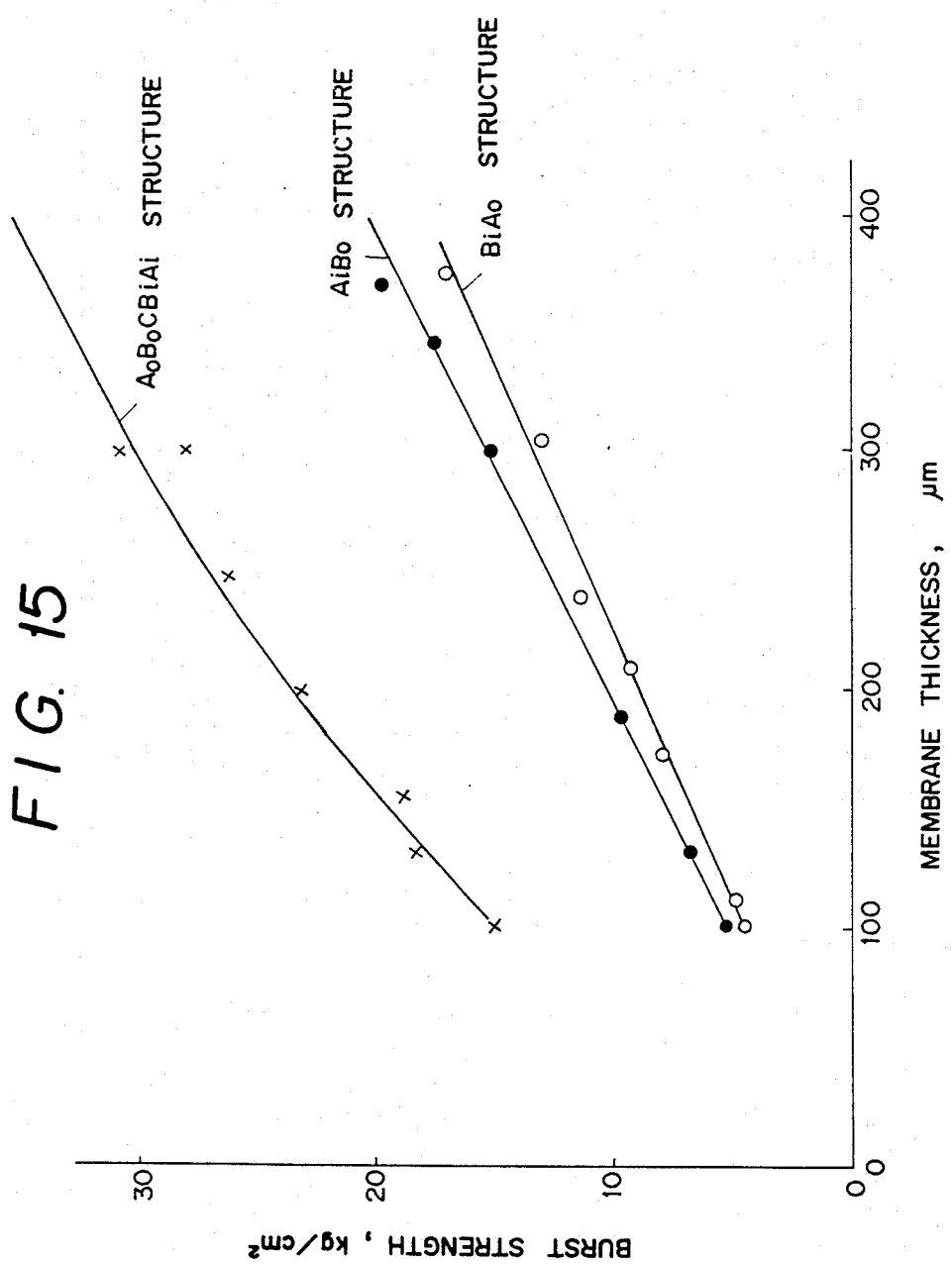
FIG. 15 is composed of graphs showing the relationship between the burst strength and the thickness, said graphs were obtained from the data on a hollow fiber membrane of an $A_oB_oCB_iA_i$-composed five-layer sturcture, a hollow fiber membrane of an A-B structure and a hollow fiber membrane of a B-A structure.

The aromatic polysulfone type resin hollow fiber membrane of the present invention is capable of passing therethrough a globular protein having a molecular weight of less than 13,000, but incapable of passing therethrough substances having molecular weights larger than the mentioned above, such as albumin, globulin contained in body fluid, pyrogen substances, bacteria (1-2 $\mu$m), yeast (2-4 $\mu$m) and causative viruses of diseases (molecular weight: 2,400,000). Accordingly, the hollow fiber membrane of the present invention has a wide variety of prospective uses, and can advantageously be used for removal of pyrogen substances from the parenteral solution or from the infusion solution, preparation of the absolutely-purified water and concentration of proteins. The hollow fiber membrane of the present invention can advantageously be used especially in the applications where the membrane is required, before it is used for separation and purification of substances, to be repeatedly subjected to sterilization under high temperatures, sterilization with acid, alkali or the like, such as separation and purification of medical products or food stuffs or preparation of the absolutely-purified water.

What is claimed is:

1. An aromatic polysulfone type resin hollow fiber membrane having a thickness of 100 to 600 82 m and a five-layer structure of an outer surface layer, an outer void layer, an intermediate layer, an inner void layer and an inner surface layer and wherein said inner and outer void layers are present in a thickness ratio of the inner void layer to the outer void layer of 1.5 to 0.6, and said intermediate layer has a thickness of 5 to 70 $\mu$m and an average pore diameter of 0.1 to 9 $\mu$m, said hollow fiber membrane having a cut-off molecular weight of 13,000 or less.

2. A hollow fiber membrane according to claim 1, wherein said inner and outer void layers are present in a thickness ratio of said inner void layer to said outer void layer of 1.4 to 1.0.

3. A process for producing an aromatic polysulfone type resin hollow fiber membrane comprising the steps of extruding into an air space an electrolyte free spinning solution of an aromatic polysulfone type resin in an organic polar solvent for said resin, said solution containing a glycol in an amount of 0.5 to 30% weight based on the total weight of the spinning solution and having a resin concentration of from 15 to 35% weight, from an annular spinning nozzle which is provided with a polymer-extruding annular orifice having an orifice width of from 110 to 700 $\mu$m as measured on the polymer-extruding side of the nozzle to obtain an extrudate in the form of a hollow fiber, allowing the thus obtained extrudate to run 0.1 to 30 cm in the air space while simultaneously injecting as internal coagulating liquid a liquid miscible with said organic polar solvent but incapable of dissolving the polysulfone type resin into the annular spinning nozzle at an inside bore thereof, and subsequently introducing said extrudate into a coagulating liquid bath comprising a liquid miscible with said organic polar solvent but incapable of dissolving the polysulfone type resin.

4. A process according to claim 3, wherein said internal coagulating liquid is the same as said coagulating liquid bath.

5. The process according to claim 3, wherein glycol is a member selected from the group consisting of ethylene glycol, propylene glycol and a mixture thereof.

* * * * *

UNITED STATES PATENT AND TRADEMARK OFFICE
CERTIFICATE OF CORRECTION

PATENT NO. : 4,822,489

DATED : April 18, 1989

INVENTOR(S) : Takashi Nohmi and Yasuo Hashino

It is certified that error appears in the above-identified patent and that said Letters Patent is hereby corrected as shown below:

IN THE CLAIMS:  Claim 1, Col. 30, line 17 "82" should be --$\mu$--.

Signed and Sealed this

Nineteenth Day of June, 1990

Attest:

HARRY F. MANBECK, JR.

*Attesting Officer*    Commissioner of Patents and Trademarks